United States Patent
Koyun et al.

(10) Patent No.: US 9,325,708 B2
(45) Date of Patent: Apr. 26, 2016

(54) SECURE ACCESS TO DATA IN A DEVICE

(75) Inventors: Ismet Koyun, Worms (DE); Felix Madlener, Worms (DE); Ralf Laue, Neu-Isenburg (DE)

(73) Assignee: KOBIL Systems GmbH, Worms (DE)

( * ) Notice: Subject to any disclaimer, the term of this patent is extended or adjusted under 35 U.S.C. 154(b) by 601 days.

(21) Appl. No.: 13/488,863

(22) Filed: Jun. 5, 2012

(65) Prior Publication Data
US 2012/0311322 A1 Dec. 6, 2012

(30) Foreign Application Priority Data

Jun. 6, 2011 (DE) .......................... 10 2011 050 863
Jul. 1, 2011 (DE) .......................... 10 2011 051 498

(51) Int. Cl.
| | | |
|---|---|---|
| *G06F 21/00* | (2013.01) | |
| *H04L 29/06* | (2006.01) | |
| *H04W 12/04* | (2009.01) | |
| *G06F 21/42* | (2013.01) | |
| *G06Q 20/32* | (2012.01) | |
| *G06Q 20/36* | (2012.01) | |
| *G06Q 20/38* | (2012.01) | |
| *G07F 7/10* | (2006.01) | |

(52) U.S. Cl.
CPC ............ *H04L 63/0892* (2013.01); *G06F 21/42* (2013.01); *G06Q 20/3227* (2013.01); *G06Q 20/3674* (2013.01); *G06Q 20/3829* (2013.01); *G07F 7/1091* (2013.01); *H04L 63/062* (2013.01); *H04W 12/04* (2013.01)

(58) Field of Classification Search
CPC ............ G06F 21/44; G06F 21/42; H04L 9/08
USPC ............. 713/155, 156, 158; 380/44, 259, 281
See application file for complete search history.

(56) References Cited

U.S. PATENT DOCUMENTS

| | | | |
|---|---|---|---|
| 8,141,142 B2 * | 3/2012 | Hourselt | 726/10 |
| 8,510,572 B2 * | 8/2013 | Kato et al. | 713/193 |
| 2004/0177260 A1 * | 9/2004 | Gilfix et al. | 713/193 |
| 2006/0198517 A1 * | 9/2006 | Cameron et al. | 380/44 |

(Continued)

FOREIGN PATENT DOCUMENTS

| | | |
|---|---|---|
| WO | WO 01/06699 A2 | 1/2001 |
| WO | WO 2004/070587 A1 | 8/2004 |

OTHER PUBLICATIONS

Password Manager for Enterprise Password Management. Secure Password Vault Software; date last visited Jun. 7, 2012; 6 pages; http://www.manageengine.com/products/passwordmanagerpro/index.html.

(Continued)

*Primary Examiner* — Mohammad A Siddiqi
(74) *Attorney, Agent, or Firm* — Reinhart Boerner Van Deuren P.C.

(57) ABSTRACT

The invention concerns secure access to data in an electronic device (3). For this a link is set up with a server (2). The user of the electronic device (3) and/or the electronic device (3) carries out self-authentication in relation to the server (2). In case that the authentication is successful a first key is received from the server (2) at the device (3). The first key serves for decryption of encrypted data stored on the electronic device (3). The decrypted data are intended for a communication of the electronic device (3). Alternatively the first key is together with data stored on the electronic device (3) intended for the communication of the electronic device (3).

19 Claims, 11 Drawing Sheets

(56) References Cited

U.S. PATENT DOCUMENTS

| | | | |
|---|---|---|---|
| 2007/0297610 A1 | 12/2007 | Chen et al. | |
| 2008/0250247 A1* | 10/2008 | Touzeau et al. | 713/178 |
| 2009/0300356 A1 | 12/2009 | Crandell | |
| 2010/0070766 A1* | 3/2010 | Lu | 713/168 |
| 2011/0035596 A1* | 2/2011 | Attia et al. | 713/175 |
| 2011/0209047 A1* | 8/2011 | Olsen et al. | 715/234 |
| 2012/0101951 A1* | 4/2012 | Li et al. | 705/71 |

OTHER PUBLICATIONS

Karen Scarfone et al.; Guide to Enterprise Password Management (Draft); National Institute of Standards and Technology, U.S. Department of Commerce, Special Publication 800-118 (Draft); Apr. 2009; 38 pages.

Michael Malkin et al.; Experimenting with Shared Generation of RSA Keys; Konferenzband Internet Societys 1999 Symposium on Network and Distributed System Security (SNDSS); 1999; 14 pages.

Dan Boneh et al.; Efficient Generation of Shared RSA Keys;Konferenzband Advances in Kryptology—Crypto 97, LNCS 1294; known prior to Jun. 5, 2012; 21 pages.

Michael Ben-Or et al.; Completeness Theorems for Non-Cryptographic Fault-Tolerant Distributed Computation; extended abstract; 1988; 10 pages.

Josh Cohen Benaloh; Secret Sharing Homomorphisms: Keeping Shares of a Secret Secret (Extended Abstract); 1998; 10 pages.

The Transport Layer Security (TLS) Protocol, Verson 1.2; Request for Comments (RFC) Document 5246; Aug. 2008; 104 pages.

Wikipedia; Zip (file format); pages printed from the internet; Mar. 9, 2014; 8 pages; "http://en.wikipedia.org/w/index.php?title=Zip . . . ."

* cited by examiner

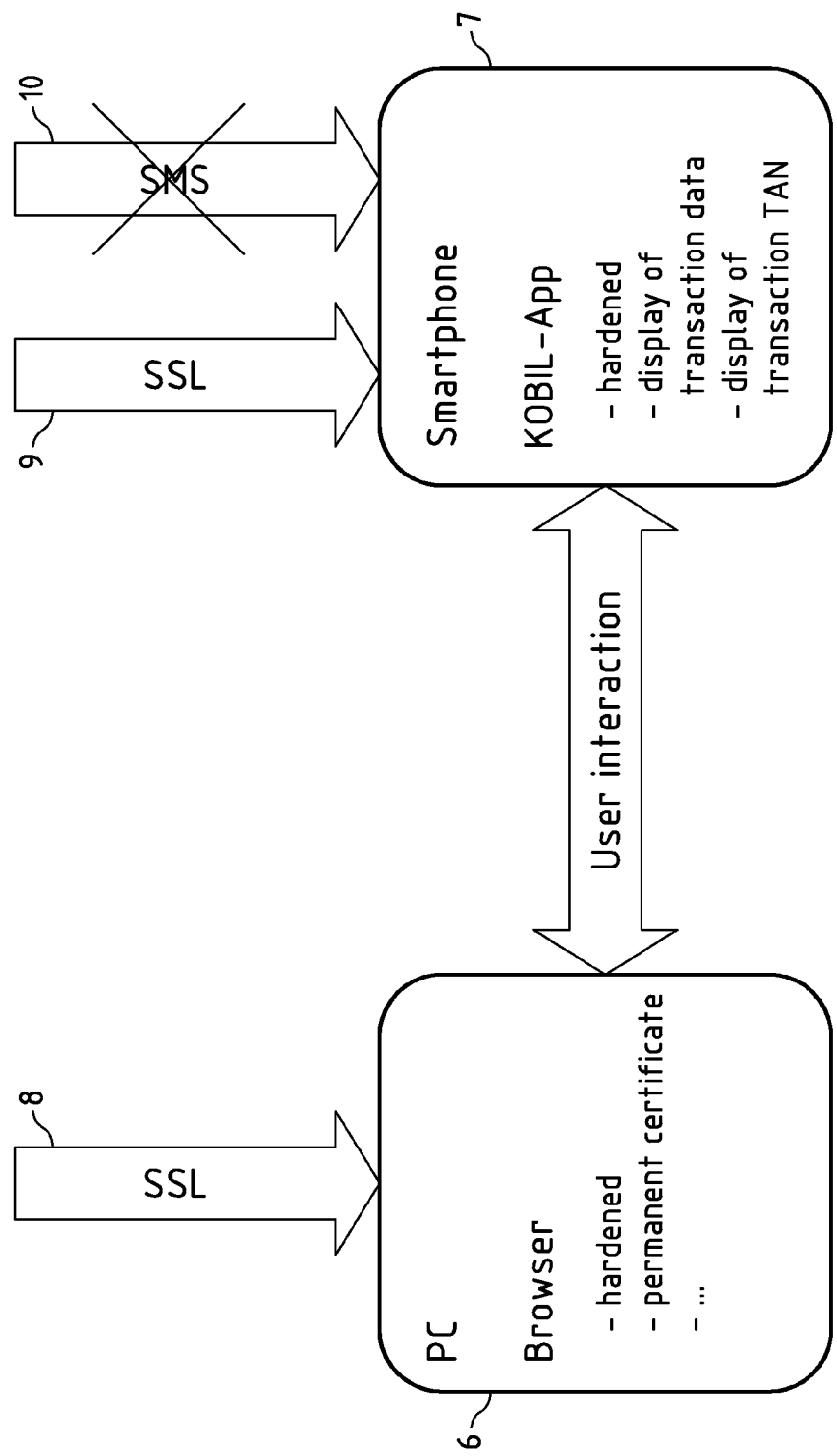

US 9,325,708 B2

SECURE ACCESS TO DATA IN A DEVICE

CROSS REFERENCE TO RELATED APPLICATIONS

This patent application claims priority to German Patent Application No. 10 2011 050 863.5, filed Jun. 6, 2011, and German Patent Application No. 10 2011 051 498.8, filed Jul. 1, 2011, the entire teachings and disclosure of which are incorporated herein by reference thereto.

FIELD OF THE INVENTION

The invention concerns secure access to data in a device, in particular to sensitive data such as for example software for performing communication and/or a secret key of an asymmetrical pair of keys, which secret key is to be used for authentication, signing and/or for encrypted communication.

BACKGROUND OF THE INVENTION

Nowadays a whole range of services with security implications are delivered via the Internet. Thus for example it is known to perform banking transactions or payments via the Internet. Online applications, such as online banking or online payment, represent a target for hackers, however, who want to find out the security data of a user and use this to carry out online transactions in the name of the latter. For example, the authentication data of the user are stolen through various techniques such as phishing or use of Trojans, and subsequently employed to make payments.

BRIEF SUMMARY OF EMBODIMENTS OF THE PRESENT INVENTION

Even if the authentication data of a user of an electronic device (for example a secret key) are protected in the device by a password that the user must enter if he wishes to authenticate these data, malware can be used and/or control taken of the device by criminals to access these authentication data and then put them to improper use.

It is inter alia the object of example embodiments of the invention to overcome this disadvantage.

This object is solved by a method, carried out at (e.g. by) an electronic device, and by a method carried out at (e.g. by) a server. Furthermore, the object of the invention is solved by a computer-readable storage medium, and apparatuses according to embodiments of the claimed invention. Advantageous configurations can be inferred from the dependent claims.

It is disclosed a method according to the invention, performed at an electronic device, which comprises setting up a link with a server; authenticating the user of the electronic device and/or the electronic device in relation to the server; and obtaining a first key from the server upon (e.g. only in case of) successful authentication, wherein the first key serves for decryption of encrypted data stored on the electronic device to obtain decrypted data intended for a communication of the electronic device (e.g. are necessary for example for an authentication in the context of the communication), or wherein the first key together with data stored on the electronic device is intended for the communication of the electronic device.

It is disclosed a method according to the invention, performed at a server, which comprises setting up a link with an electronic device; authenticating the user of the electronic device or the electronic device; and outputting a first key upon (e.g. only in case of) successful authentication, wherein the first key serves for decryption of encrypted data stored on the electronic device to obtain decrypted data intended for a communication of the electronic device, or wherein the first key together with data stored on the electronic device is intended for the communication of the electronic device.

It is disclosed a computer-readable medium according to the invention, which comprises a computer program with program instructions, which cause a processor to perform and/or control the steps of one of the methods according to the invention (either the one performed at the electronic device, or the one performed at the server), when the computer program is running on the processor. Such a computer program will be referred to as a computer program according to the invention or software according to the invention in the following. Here the processor can for example be part of the electronic device or of the server, on which the corresponding method according to the invention is carried out. The computer program can at least in part be software and/or firmware of a processor.

The computer-readable medium according to the invention additionally or alternatively comprises a computer program development kit that comprises computer program modules for creating a computer program according to the invention.

The computer-readable storage medium may for instance be a data storage device. It may for example be embodied as a magnetic, electrical, electromagnetic, optical and/or other kind of storage medium. It may for instance be a tangible storage medium.

It is disclosed an apparatus according to the invention, which comprises at least one processor; and at least one memory including computer program code, the at least one memory and the computer program code configured to, with the at least one processor, cause the apparatus at least to perform at least one of the methods according to the invention. The apparatus according to the invention is for example the electronic device at which the corresponding method according to the invention is carried out, or the server, at which the corresponding method according to the invention is carried out.

A system according to the invention may for instance comprise the electronic device and the server.

In the following, example embodiments of the present invention are described, which focus on further example characteristics of the methods according to the invention, of the computer-readable storage media according to the invention and of the apparatuses according to the invention. In particular, through the description of an additional method step of a method according to the invention it should also be deemed that disclosure has been made of a correspondingly programmed computer-readable medium according to the invention and of a correspondingly configured apparatus according to the invention, and vice versa.

An electronic device is for example an apparatus, which is set up for processing data with the help of a processor, e.g. a data processing device such as a computer, a thin client, a server, a portable computer, a Personal Digital Assistant, a mobile telephone and/or any other electronic device, having a processor. A processor also covers, inter alia, control units, microprocessors, micro-control units such as microcontrollers, digital signal processors (DSP), Application Specific Integrated Circuits (ASICs) or Field Programmable Gate Arrays (FPGAs).

For example, a computer program stored on a computer-readable medium according to the invention could be run by a processor of an electronic device and cause the electronic device to perform the corresponding method according to the invention at the electronic device.

The link between the electronic device and the server is for example a cabled and/or a wireless data link. For example, the link is at least in part a network data link (e.g. an Ethernet, Fast Ethernet, Gigabit Ethernet, DSL (Digital Subscriber Line) and/or a WLAN data link) and/or at least in part a mobile telephone data link (e.g. a GSM (Global System for Mobile Communications), UMTS (Universal Mobile Telecommunications System), GPRS (General Packet Radio Service), HSDPA (High Speed Downlink Packet Access), HSUPA (High Speed Uplink Packet Access) and/or an LTE (Long Term Evolution) data link). By way of example the data link is created via a local area network (LAN), a wide area network (WAN) and/or the Internet. For example, the electronic device comprises at least one data interface for setting up a data link with the server and/or the server comprises at least one data interface for setting up a data link with the electronic device.

Only if the server successfully authenticates the user (and/or the electronic device), is the first key output by the server, e.g. sent via the link to the electronic device. Only if the user (and/or the electronic device) successfully self-authenticates in relation to the server, is the first key received at the electronic device, e.g. received via the link with the server.

The authentication of the user of the electronic device (and/or of the electronic device) in relation to the server takes place by way of example by the output of user authentication information by the electronic device to the server, e.g. via the link with the server. The authentication of the user (and/or of the electronic devices) at the server takes place for example by checking user authentication of the electronic device obtained by the server, e.g. received via the link with the electronic device.

User authentication information can be for example a password, a digital signature and/or a software certificate, such as for example an RSA (Rivest Shamir Adleman) certificate. The user authentication information is for example obtained at the electronic device through user input and/or via a user authentication device connected with the electronic device. The authentication of the user (and/or of the electronic device) takes place for example in the form of a so-called two-factor authentication. The user authentication information can also contain or comprise biometric information on the user. For example, a fingerprint, a voice sample or an iris scan can serve as user authentication information.

The user authentication information is preferably not (or at least not permanently) stored in the electronic device, since it is checked exclusively at the server.

The user authentication information is for example user-related and serves for authentication of a particular user or a group of users by the server. For example during an initialisation phase to be performed once for each user, the respective individual (e.g. different for each user) user authentication information of the user is defined at the server. In the initialisation phase the user carries out self-authentication for example by a one-time activation password to the server. For example, the user receives a one-time activation password via a separate channel such as by post.

By checking the authentication information output by the electronic device to the server against the user authentication information defined in the initialisation phase the user (and/or the electronic device) can for example be authenticated at the server. Failed authentication attempts by a user of the electronic devices (and/or by the electronic device) in relation to the server can for example be counted by the server. For example, if a certain (e.g. pre-defined) number of failed authentication attempts by a user (and or by the electronic device) is exceeded the user (and/or the device) can be blocked by the server. In this way, for example, a successful authentication of an attacker in respect of the server by simple trial and error (the so-called brute force method) can be prevented.

For authentication of the user and/or of the electronic device in addition to the user authentication information (for example a PIN) further information can be made available to the server (and also received and checked by the latter), for example information on a program (e.g. an app) that the user employs for authentication in relation to the server (this program can for example be the program according to the invention or part thereof). The information can for example concern an identification (for example in the form of a unique identification number) of the program and/or a state of the program. On the basis of this information the server can for example check if the program is registered (for example at the server) for the electronic device (e.g. for a specific electronic device and not for another electronic device), whether the program is still in the original state (or in a state which is the result of the original state and merely official updates) and/or if the version of the program is correct or an update is necessary. Only then for example can the authentication of the user and/or of the electronic device be considered successful and the first key issued, if it has been established that the user authentication information is correct, the program is registered for the electronic device, the program is in the original state (possibly including official updates) and or is in the correct version.

The first key is for example an individual key for each user (and/or the electronic device). The first key is for example defined for each user (and/or each electronic device) in an initialisation phase to be performed once only and is saved permanently at the server only. The first key is preferably not stored permanently in the electronic device and after each performance of the method according to the invention at the electronic device, the first key is deleted in the electronic device. By way of example the key has a length of 128 bits, 192 bits or 256 bits. This is an advantage, inter alia, in order to enable the user to employ a simple password for authentication in relation to the server but at the same time to allow the communication of the electronic device to be protected by a secure password.

The communication for which the decrypted data are intended, is for example a particular (e.g. predefined) communication (e.g. a particular (e.g. predefined) type of communication), and/or a communication with one or more particular (e.g. predefined) communication partners (e.g. servers).

The communication concerned is for example not the only communication that the electronic device can perform. Thus other communications without the part of the software contained in the encrypted data are possible and/or can be controlled.

The communication concerned is for example a communication that requires an authentication of the electronic device and/or an authentication of a user of the electronic device (and/or of the electronic device). The decrypted data can then for example contain at least part of the information necessary for this authentication (for example the second key) or be necessary for use of (for example access to) at least part of such information. The authentication can for example be an authentication (for example a client-side authentication, which inter alia requires a signing of data (for example a challenge sent from the server to the client) with a secret key of the client) in the context of a secure link, for example a Secure Socket Layer (SSL)/Transport Layer Security (TLS) link according to Request for Comments (RFC) document 5246 or a secure link according to a proprietary protocol. The authentication can additionally or alternatively for example comprise the signing of a message (for example through encryption of a hash value of the message), for example with the second key. The message can for example be a confirmation of a log-in or transaction process, which the user carries out at the server of a service provider (which server for example is different from or the same as the server from which the key is received), for which the user is displayed information at the electronic device and which the latter can confirm or reject. The signed message is then for example transmitted to the server and verified and or archived there.

For example, the electronic device can only perform the communication with the help of the first key, for example an online banking communication. This is advantageous, inter alia, because an attacker, even if in possession of the electronic device, must perform a successful self-authentication in relation to the server in order to be able to use the communication of the electronic device.

The communication is for example a secure communication with a server, for example with a server of an online banking communication service. This server can correspond to the server from which the first key is obtained or can be another server. The secure communication serves for example for the exchange of online banking transaction information and/or transaction numbers (TANs) for the confirmation of online banking transactions via a secure channel, or for confirmation or rejection of log-in and/or transaction procedures which are carried out by the user of the electronic device on a server of service provider, via a secure channel, in particular via a secure channel, which is separate from the channel via which the user of the electronic device carries out the login and/or transaction procedures at the server of the service provider.

For example, the first key serves for decryption of encrypted data stored on the electronic device, wherein the decrypted data is intended for the communication of the electronic device. The data are for example encrypted with the first key, e.g. asymmetrically or symmetrically. For example, the data are encrypted according to an Advanced Encryption Standard (AES) encryption method. The first key is for example an AES key.

For example the decrypted data comprise at least a part (or also all components) of a software (for example an application that has been downloaded to the electronic device), which at least partially enables and/or at least partially controls communication of the electronic device (for example with an online banking server). The executable program code of the software can then for example be stored in encrypted form in a memory (for example a program memory such as a flash memory) of the electronic device and only be executable once it has been decrypted. For execution it can then be copied (in decrypted form) for example to another memory of the electronic device or to another memory area of the same memory, in which it was stored in encrypted form. For the purposes of execution the executable program code can be decrypted in a volatile memory, for example a RAM (by way of example a working memory). Once it has been executed it can then for example be deleted from the volatile memory or overwritten. In this way it can be advantageously avoided that the decrypted program remains permanently in decrypted form.

Additionally or alternatively to the part of the software the decrypted data contain at least a second key (or a part of this), with which (or on the basis of which) the user (and/or the electronic device) can for example perform self-authentication in relation to a communication service, e.g. an online banking communication service, or a server, for example the server from which the first key was obtained. The second key can for example be used for client-side authentication when setting up a secure link (for example a SSL or TLS link) to a server (for example the server, from which the first key is obtained) and/or for signing of messages (for example confirmations of logins and/or transaction processes). With client-side authentication, the electronic device can for example sign a challenge provided by the server, which then in turn can be checked with a key associated with the second key on the server (for example by decryption of the hash value of the challenge contained in the signature, recalculation of the hash-value of the challenge at the server and comparison of the hash-values).

Additionally or alternatively to the part of the software the decrypted data can also simply contain a part of a second key, which only in conjunction with a further part of the second key (which for example is saved in the server, for example in encrypted or unencrypted form) can be used for authentication. The two parts can constitute for example a distributed key, for example a distributed private RSA key.

If the decrypted data comprise at least part of the software, which at least partially enables and/or at least partially controls a communication of the electronic device, and the second key (or a part of this), the second key (or part thereof) can for example be contained in the part of the software and/or be associated with this part of the software. In the former case the second key (or part thereof) is then for example encrypted by encryption of the part of the software, in the latter case the second key (or part thereof) is for example encrypted together with the part of the software or separately from this. The second key (or part thereof) can then for example serve at least for partial authentication in connection with the communication, which through the part of the software is at least partially enabled and/or at least partially controlled.

The second key is for example a secret key of an asymmetrical pair of keys, serving for authentication of the user and/or the electronic device (for example at a communication service, e.g. a server of the communication service, or at a server, for example the server, from which the first key is obtained). An example of the asymmetrical encryption method is the Rivest-Shamir-Adleman (RSA) method. For example, the second key is an RSA-key.

The second key can for example be stored in a first memory of the electronic device, while other secret keys of the electronic device are stored in a second memory. The second and the first memories can for example be different memories. The second memory can for example already be available at the very time of delivery of the electronic device, while the first memory for example is only reserved or stored on the electronic device for example upon installation of a software, with which the authentication is performed at the server (for example the computer program according to the invention). The first memory is for example fully encrypted with the first key and can only be decrypted with this.

The decrypted data can for example contain at least a part of a software and/or information, which is necessary for obtaining authentication information stored on the server (such as for example a key or a part thereof, for example the second key already described, or information derived from this key). The authentication information can for example serve for at least partial authentication of the electronic device and/or of a user of the electronic device in the communication of the electronic device. The authentication information (for example a secret key or a part thereof) can for example be stored in encrypted form on the server and the information contained in the decrypted data can then for example be a key for decryption of this authentication information. If the authentication information is part of a secret key, the other part can for example be stored in the device; it can for example be part of the decrypted data.

The decrypted data can for example contain at least part of a software and/or information, necessary for using authentication information, which an apparatus (wireless or cabled) that can be connected with the electronic device (for example a Smartcard reader or a storage medium) is able to access.

The authentication information (such as for example a key or a part thereof, for example the second key already described or a part thereof, or information derived from this key) can for example serve for authentication of the electronic device and/or of a user of the electronic device in the communication of the electronic device. The authentication information may for example not be able to be read out from the apparatus. Use of the authentication information can for example comprise performing operations with data (for example a signing or encryption) by using the authentication information and obtaining the results.

The information contained in the data that has been decrypted (with the first key) can then for example be information (e.g. a password or a PIN of the apparatus or a medium, which the apparatus is able to access), which is necessary for use of the authentication information.

The information can for example have been entered by a user of the electronic device (for example once only) and then (possibly with other data) have been encrypted with the first key, in order to obtain the encrypted data.

The information contained in the data that has been decrypted (with the first key) can for example be a key, with which information stored on the server (e.g. a password, a PIN of the apparatus or a medium, which the apparatus can access, or part of the password/PIN), which is necessary for use of the authentication information, is encrypted. By way of example, the server can store a PIN in encrypted form, wherein the key for decryption of the PIN is contained in the data that is decrypted (with the first key) and the PIN is necessary for use of the authentication information of the apparatus (for example because the PIN of a Smartcard is involved which the apparatus can access when the PIN is present). The server can also store just a part of this PIN in encrypted form, wherein the other part then for example must be entered (for example unencrypted) on the electronic device or the apparatus.

If the decrypted data contain at least part of a software, which is necessary for use of authentication information, which an apparatus that can be connected to the electronic device can access, the software can for example contain information that is necessary for authentication in relation to the apparatus. This information can for example be different from a PIN (for example a Smartcard PIN) associated with the authentication information, which the apparatus can access, and for example be specific only to the apparatus (for example a Smartcard reader).

For example, the first key together with data stored in the electronic device is intended for the communication of the electronic device. For example, the first key together with a second key stored in the electronic device forms a third key with which the user (and/or the electronic device) can perform self-authentication in relation to a communication service, e.g. an online banking communication service, or a server. The third key is for example a secret key of an asymmetrical pair of keys that serves for authentication of the user (and/or of the electronic device) in relation to the communication service (or a server of the communication service). For example, the third key is an RSA key. In this way use of the communication is only possible if both the first key stored on the server and the second key stored in the electronic device are known.

According to an example embodiment of the invention the authenticating of the user of the electronic device and/or of the electronic device in relation to the server comprises obtaining user authentication information on the electronic device; and the passing on of the user authentication information to the server.

According to an example embodiment of the invention the user authentication information is obtained from a user authentication apparatus at the electronic device.

The user authentication apparatus is for example a card reader, for example a card reader of safety class 1, 2, 3 or 4 according to the specification of the Zentral Kreditausschuss (German Central Credit Committee—ZKA). Preferably a card reader of safety class 3 or 4. For example, a Smartcard can be set up in such a way that it enables the user authentication information only to be read by the card reader and issues this to the electronic device connected to the card reader if the user has entered a password (e.g. on the electronic device or on the card reader) assigned to the user authentication information (two-factor authentication), e.g. the user authentication information could be encrypted and could be decrypted with the password by means of the Smartcard (e.g. within the Smartcard). The Smartcard is for example a digital ID card.

The user authentication apparatus is for example connected by cable or wirelessly with the electronic device, for example via a Bluetooth data interface and/or a USB data interface or via an NFC link.

According to an example embodiment of the invention the methods according to the invention also comprise in an initialisation phase registering the user (and/or the electronic device) and/or the user authentication information at the server.

According to an example embodiment of the invention the method according to the invention, carried out at the electronic device comprises decrypting the encrypted data stored in the electronic device with the first key; and using the decrypted data for the communication.

According to an example embodiment of the invention the method according to the invention, carried out at the electronic device comprises encrypting of the data with the first key; and storing of the encrypted data in the electronic device. If the first key has been generated individually for a user of the electronic device (and/or the electronic device), through the encryption of the data (for example a software for communication of the electronic device and/or of the second key) an individualisation of the encrypted data on the electronic device is also automatically achieved. In this way it can firstly be achieved that (criminal) analysis of the encryption is made difficult since—even when the same data is assumed on a number of electronic devices, wherein the data are however encoded on each electronic device with different first keys—a number of electronic devices would have to be called upon, and secondly that even with the (criminal) discovery or (criminal) calculation of the first key of an electronic device only the data of this electronic device, but not the data of other electronic devices are accessible/usable.

According to an example embodiment of the invention the data stored in the electronic device comprise at least a second key for authentication of the user of the electronic device and/or of the electronic device (or a part of the second key) and/or for encryption of the communication of the electronic device and/or for signing of messages of the electronic device. The authentication of the user and/or of the device can for example be necessary for setting up a secure link (for example an SSL or TLS link) between the device and a server (for example a server of an online service provider (e.g. for online banking) or the server from which the first key is obtained), for example for client-side authentication. By way of example the second key is used for signing a challenge received from the server (or for example of information that is generated by the electronic device and/or the server, wherein this information for example depends upon the session in which the authentication takes place), wherein the signature can then be checked at the server with a key associated with the second key. The secure link can for example be based on symmetrical encryption on the basis of a session key, wherein the session key, or information, upon which the session key is dependent, is for example encrypted with a public key of the server through the electronic device and then can be decrypted by the server with the associated private key, by means of which for example the server-side authentication can be achieved. The session key can additionally or alternatively be used for or as a basis for a MAC (Message Authentication Code) protection of the secure link. By way of example there is a first session key for encryption and a second session key for the MAC protection. Both session keys can however be derived from the same session key, e.g. by hash-value creation.

Messages of the electronic device (for example login and/or transaction procedures confirmed or rejected by the electronic device, for example at a server of an online service provider such as for example a bank), can be signed with the second key (for example by hash-value creation and encryption of the hash-value), for example also if these confirmed or rejected login and/or transaction procedures are sent via a secure link, since the signed confirmed or rejected login and/or transaction procedures can then be archived for evidence purposes in signed form. If the second key is used for authentication in relation to the server, from which the first key was received (and at which authentication of the user and/or of the device has already taken place using the user authentication information), the advantageous effect is achieved that the user can enable the second key, which is for example a longer RSA key, through for example relatively short user authentication information (for example a four- or five-digit PIN) and for example need no longer be bothered with the authentication based on the second key (for example when setting up a secure link and/or when signing messages), since this then for example takes place automatically. A further advantageous effect is that prior to enablement of the second key by the server not only is the PIN of the user checked, but optionally also further characteristics of the electronic device and/or of the software, with which the user authenticates himself in relation to the server, for example if the software is still in the original state (or in a state which is the result of the original state and merely official updates), if the version of the software is up to date, and/or if the software is registered for the electronic device.

According to an example embodiment of the invention the method according to the invention, carried out at the electronic device, also comprises in an initialisation phase generating the second key at the electronic device.

The second key can for example be a secret (or private) key of an asymmetrical pair of keys (for example a pair of RSA keys). Here for example a public key corresponding to the second key can be generated, which for example is output by the electronic device, for example to the server, from which the first key is obtained.

The method according to the invention, carried out at the electronic device, may further comprise in the initialisation phase outputting a public key associated with the second key to the server to enable the server to generate a certificate (e.g. a public key certificate) based on the public key signed with a key of the server. The certificate may for instance comprise the public key and a signature of a representation (e.g. a hash value) thereof. The signature is generated with a key of the server, e.g. a private key of the server. The private key of the server may for instance constitute a certification authority (e.g. be the secret key (ROOT key) of the certification authority) or may be associated with a certificate (which for instance comprises its associated public key) that has been signed with the secret key (ROOT key) of a certification authority. The certificate generated by the server may for instance be checked with a certificate (e.g. a public key certificate) that corresponds to the server's private key and for instance has been signed with the secret key of a ROOT CA.

The certificate generated by the server may for instance be received by the electronic device from the server. It may then for instance be provided to an entity (e.g. an online service provider like e.g. a bank) to allow the entity to authenticate at least one of the user of the electronic device and the electronic device. The entity then may for instance be able to check the certificate received from the electronic device based on the server's certificate.

Alternatively, the certificate generated by the server may be provided to the entity by the server.

According to an example embodiment of the invention the first key is a key that is individual to the user, wherein the first key can be generated by the server during the initialisation phase (thus for example is generated). In particular, the key can be generated by the server in an initialisation phase in a random manner (thus for example is randomly generated), thus for example according to a specification for generation of a random key (for example by a shift register).

According to an example embodiment of the invention the link with the server and/or the communication of the electronic device is secured. In particular the link and/or the communication is/are secured according to the Secure Socket Layer (SSL) protocol and/or the Transport Layer Security (TLS) protocol.

According to an example embodiment of the invention the communication of the electronic device is an online banking communication. Alternatively the communication of the electronic device can be a communication of the electronic device with the server, from which the first key is obtained. In the context of this communication for example information on login and/or transaction procedures, which for example are carried out in connection with the use of an online service (for example online banking), can be sent from the server to the electronic device and displayed there to the user, so that the user can confirm or reject the login and/or transaction procedures. In the context of the communication information on the confirmation or rejection by the user can then be sent to the server (for example signed with the second key), which then for example sends information on the confirmation or rejection of the user to a further server, for example a server, on which the login and/or transaction procedure was carried out.

According to an example embodiment of the invention the communication takes place between the electronic device and the server and serves for authentication—in particular of the (for example additional) out of band authentication—of the user for login and/or transaction procedures, which are carried out by the user of the electronic device with the electronic device or another device at a server of a service provider. By way of example the server of the service provider (for example an online banking server) can send a query to the server, from which the first key is obtained, in order to obtain confirmation of the login and/or transaction procedure. The server (from which the first key is obtained) can at this point send information concerning the login and/or transaction procedure to the electronic device and ask the user for confirmation or rejection. The query for confirmation or rejection can for example be shown in a display provided by the software which the user employs for self-authentication at the server, which differs from a display that is likewise provided by the software or at least controlled by this, in which information from an application (for example a browser application), via which the user carries out the login and/or transaction procedures, is displayed. Information concerning the confirmation or rejection of the user can then, for example be sent back signed with the second key, to the server (from which the first key is obtained), which then returns corresponding information to the querying server of the service provider. In this way on a communication channel between the server, from which the first key is obtained and the electronic device that is separate from the communication of the electronic device (or another device, for example a computer) with the server of the service provider (thus an out of band channel), therefore an additional authentication (an out of band authentication) of the user is possible in the context of the login and/or transaction procedure. Instead of the confirmation of the login and/or transaction procedure at the electronic device the user can also be asked to enter a code which is generated by the server, from which the first key is obtained, (for example in turn at the request of the server of the service provider) and sent to the electronic device, as authentication information, for example in an application (for example an Internet page), via which the user has carried out the login and/or transaction procedure and which runs either on the electronic device or on another device, for example a computer. The code is then for example passed to the server of the service provider and from this to the server which generated the code for verification, and a corresponding result is returned to the server of the service provider.

According to an example embodiment of the invention the communication takes place between the electronic device and the server and serves for passing on of authentication information, which is necessary for a login and/or transaction procedure, which the user of the electronic device wishes to carry out with the electronic device at a server of a service provider, from the server to the electronic device. The authentication information (for example a one-time code) can for example be received at the electronic device and processed by or passed to (for example automatically) an application running on the electronic device via which the login and/or transaction procedure is carried out by the user, so that a manual entry of authentication information (such as for example a username and/or password) in the application by the user is no longer necessary. The user simply has to carry out self-authentication in relation to the server, from which the first key is obtained, and a new authentication in relation to the application is not necessary. Here for example the application can be part of a software (for example the software according to the invention), that also carries out or controls the method according to the invention, to the extent that this is carried out at the electronic device, and/or the communication of the electronic device with the server. The application can for example be a browser application, for example a hardened browser application. Alternatively the application can also be available separately from the software on the electronic device (for example as a browser) and at least partially used and/or controlled by the software. By way of example the software can integrate a separate browser application present on the electronic device into the software and make use of its functionalities (for example as a web view component).

According to an example embodiment of the invention the method according to the invention, carried out at the electronic device, is carried out and/or controlled by software stored on the electronic device. The software can for example be downloaded as an application (App) to the electronic device and installed on it. The software can for example be stored in unencrypted form on the device. The software can for example comprise a certificate store with trusted certificates (for example from certificate authorities rated as trusted) and store this for example on the electronic device. The public keys of certificates from this certificate store are for example used for checking certificates received or are used by themselves without further checking in the communication of the software (since they are rated as trusted). This certificate store is for example a certificate store that is different from the certificate store that was available prior to the installation of the software on the electronic device. The certificate store can for example be exclusively accessible via the software only and/or exclusively modifiable via the software only. The software can further encrypt the second key with the first key and store this on the device. The software can comprise or at least control an application (for example a browser application) for carrying out login and/or transaction procedures at a server of a service provider (which for example differs from or corresponds with the server from which the first key is obtained). The software can for example control the application in such a way that only login and/or transaction procedures with for example servers defined via a URL white list are possible. The browser application can for example be hardened. The software can comprise a display for the browser application and another display for the messages received from the server from which the first key is obtained.

According to an example embodiment of the invention the method is carried out and/or controlled by a software stored on the electronic device, wherein at least one characteristic of the software and/or at least one characteristic of the electronic device is checked in the authentication in relation to the server (for example by the server) and the first key is obtained only if the check was successful. The at least one characteristic of the software can for example be the integrity and/or the version (in particular the correct, e.g. the highest currently available version) and/or the identity and/or the correct assignment to the electronic device of the software. The at least one characteristic of the electronic device can for example be the integrity of the user access rights provided for by the manufacturer of the electronic device for the electronic device (thus for example manipulations by means of so-called jailbreak can be excluded). Several or all of these characteristics can also be checked, and the first key accordingly then only obtained if all checks (and additionally the authentication of the user and/or of the device, for example by means of a PIN) were successful. The software can for example be considered intact (or of full integrity) if it is in the original state or in a state that is derived from the original state only through official updates. This can for example be verified by hash-values of images of the software (for example in the flash memory or RAM).

According to an example embodiment of the invention the software stored on the electronic device is a (for example unencrypted) starter software. The starter software is for example run in order to obtain the first key from the server. With the first key the data encrypted on the electronic device (for example a communications application or a part thereof, or the second key) can then be decrypted and used. The starter software can also be set up for running an initialisation phase in which a user of the electronic device (and/or the electronic device) in relation to the server carries out self-authentication and where the authentication is successful receives the first key for encryption of data for receipt of the encrypted data. If the decrypted data comprises software for the communication of the electronic device, this software together with the starter software (and possibly other components) can form a (for example unencrypted) software package, which for example can be loaded onto the electronic device as an application. Alternatively several software packages/applications can be involved.

According to an example embodiment of the invention the decrypted data comprises software for the communication of the electronic device. The software can for example be an application, which is downloadable from a server for applications, for example an online banking application, or for remote control of components or remote access to data or programs. The software can for example be a browser. By way of example the software is stored at least partially encrypted on the electronic device. In particular the software is at least a part of the data stored with encryption on the electronic device, which can be decrypted with the first key. This is, inter alia, advantageous in order to individualise the software for each user (and/or each electronic device) (at least if the first key is individual to the user), so that reverse engineering of the software is made difficult. In addition this is inter alia advantageous since an attacker, even if they are in possession of the electronic device must successfully carry out self-authentication in relation to the server, in order to be able to use the communication of the electronic device.

According to an example embodiment of the invention the software carrying out and/or controlling the method is hardened.

According to an example embodiment of the invention the software for the communication of the electronic device is hardened.

In terms of programming engineering hardened means for example using only such (dedicated) software as is necessary for the operation of the system and whose safe running in terms of security aspects can be guaranteed. Thus for hardened software (for example a browser) all software components and functions can be removed that are not absolutely necessary for performing the envisaged task by the software. A hardening function can also comprise anti-reverse engineering, anti-debugging and/or anti-code injection mechanisms.

According to an example embodiment of the invention the software is an application adapted for the electronic device. An application is in particular a so-called App, which can be obtained by the electronic device from a so-called App Store, for example in the case of a mobile telephone or a (tablet) computer.

According to an example embodiment of the invention the method, carried out at the server, in an initialisation phase also comprises outputting the first key to the electronic device for encryption of the data in the electronic device, wherein the outputting only takes place following successful authentication of the user (and/or of the electronic device) by the server.

According to an example embodiment of the invention the method, carried out at a server, in an initialisation phase also comprises the (for example random) generation of the first key.

The example embodiments and example configurations described in this specification of the present invention are also deemed to be disclosed in all combinations with one another.

Further advantageous example configurations can be inferred from the following detailed description of example embodiments of the present invention, in particular in conjunction with the figures.

The figures accompanying the application should however serve only for the purposes of clarification and not for determining the scope of protection of the invention. The attached drawings are not to scale and merely reflect the general concept of the present invention. In particular, characteristics that are shown in the figures should in no way be considered to be a necessary component of the present invention.

BRIEF DESCRIPTION OF THE DRAWINGS

The figures show as follows:

FIG. 3-5*b*: example application scenarios of the invention;

DETAILED DESCRIPTION OF THE INVENTION

Figure 1:
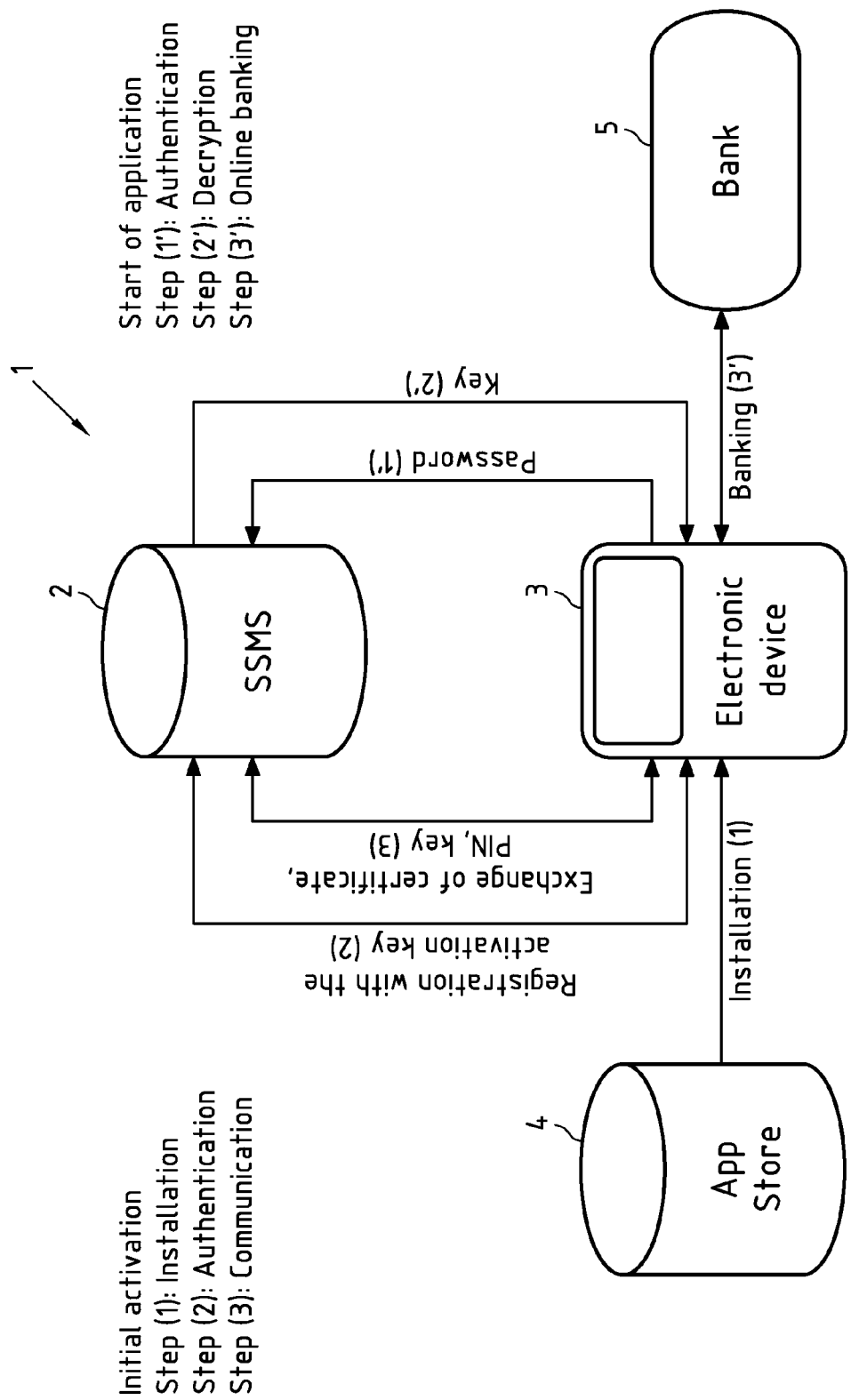
FIG. 1: a schematic representation of the components of an example embodiment of a system according to the invention and an example of the sequence of the interactions between the components.

Example configurations of the invention contain an authentication and encryption schema that can be implemented in an electronic device, for example in the form of software (thus a computer program). This schema includes a close link with a server, which is referred to in the following as SSMS (Smart Security Management Server) and functions as an additional security anchor. This link makes a considerable contribution to the increased security achieved with the invention. The SSMS serves for example to manage the devices and the software. It can be provided by a service provider independent of the bank or by the bank itself to allow online banking.

In the following the electronic device is often assumed to be a Smartphone and the software an application (or App), but the present invention is not restricted to such configurations.

The security can be increased by optionally using an additional hardware component, which for example can be connected via a wireless link, for example a Bluetooth link, to the electronic device.

Example embodiments of the invention provide a secure solution for electronic devices (in the following referred to by way of example as mobile terminals) such as for example Smartphones. There is an individual control of each instance of a software. The SSMS is used as a secure authentication instance (wherein authentication means both the process of a user demonstrating their own identity (for example in relation to a server) and the process of checking the evidence of identity of a user (for example by a server)).

Typical examples of the invention are for instance:
a software, in particular an online banking software (for example a browser), which is present on the electronic device or can be loaded onto this, or a software development kit (SDK), with which the software or an application for electronic devices can be created.

As already mentioned, a hardware component may optionally also be added.

Examples of platforms for such software are Apple's iOS or Android. The application can of course also be possible in electronic devices with Windows, Linux or BlackBerry operating systems.

In embodiments of the invention the software according to the invention runs on mobile platforms (for example mobile terminals, for example mobile telephones, PDAs, laptops or tablet computers) and provides a range of inbuilt security functions, comprising one or more of the following characteristics:

Protection against debugging and reverse engineering;
Additional software hardening methods for protection against known runtime attacks;
Protection of URLs for online services (such as for example URL addresses of banks);
An inbuilt certificate store for certificates from trusted Certificate Authorities (CA), and/or for personal certificates. This certificate store is for example linked to the software according to the invention and in particular does not correspond to the certificate store present on the mobile terminal (as for example is already present at the time of installation of the software). In this way more fine-grained security is obtained, since only the certificates that are exactly relevant for the respective application (for example for setting up/testing SSL links to servers of service providers and/or to the SSMS) have to be stored. The software can for example exclusively use only those certificates that are contained in the certificate store connected to it (for example originally contained there and/or imported by the software into the certificate store). The data in the certificate store can either be unencrypted, or encrypted—for example with the secret key of the mobile terminal which is only available following authentication at the SSMS. Access to the certificate store can for example be possible only after a successful authentication at the SSMS.

These security functions prevent offline attacks, which aim to find out weak points and investigate private user information. The URL protection ensures that users reach the correct online service. The inbuilt certificate store protects against non-legitimate digital certificates and trust anchors (CA) in the standard certificate store of the mobile terminal. Such false certificates can for example be imported tacitly, or CAs previously deemed trustworthy may for example in the meantime have been revoked but without the mobile terminal yet having been updated in this regard.

The software according to the invention is coupled with a dedicated server (the SSMS), is protected by this and is managed by it. The SSMS is hosted by a provider of online services (for example a bank) and is for example integrated in the online services (such as a web browser of a bank). The SSMS generates together with the software according to the invention, which for example runs as an application on the mobile terminal, an instance of a virtual device on the mobile terminal, which converts the mobile terminal into a unique authentication apparatus. When the software is being activated for the first time, the software is linked to the dedicated mobile device, on which it is installed, and is registered with the SSMS. Whenever the software is called the SSMS performs a series of checks with the software, for example one or more of the following checks:

if the software is actually running on the dedicated mobile terminal or has been copied to another device (this can for example be checked using an identification number of the mobile terminal, such as for example an IMEI (International Mobile Equipment Identity) or MAC (Medium Access Control)-ID, or another characteristic and unique characteristic of the mobile terminal, for example an electromagnetic fingerprint of the mobile terminal, by for example performing a check on whether the relevant values deviate from the values present at the time of registration of the software at the SSMS);
if the software is still in the original state or if it has been modified (this can for example be determined using a hash value of the software, for example in the RAM or flash memory);
if the version of the software is correct or must be updated;
if the user PIN (or a password) entered is correct;
if the dedicated mobile terminal has been provided with higher user access rights (for example root rights) than envisaged by the manufacturer, for example in order to be able to install further applications (for example manipulative applications) on the mobile terminal. This check constitutes a so-called jailbreak detection.

These checks allow to prevent attacks that are based on counterfeit software for access to online services or on modified software for amending login and/or transaction data (for example counterfeit or modified applications). Attackers would have control both the mobile terminal and the SSMS simultaneously, in order to break the chain of trust. Both ends control each other, however, and as a result can put a stop to any suspicious activity. The PIN (or password) of the user is never stored or cached in the mobile terminal; it is rather a server authentication PIN. If, for example a PIN is entered incorrectly three times, the user PIN is blocked at the SSMS.

The software according to the invention provides together with the SSMS a separate and secure communication channel. If the software is installed on a mobile terminal, with which the online services of a server (for example of a bank server) are accessed, the link between the software and SSMS (the abovementioned separate and secure communication channel) is considered to be separate from the link used for this access. If for access to the online services of a server (for example of a bank server) a computer is used, the link between a mobile terminal, on which the software is installed, is likewise separate from the link used for this access between the computer and the server. Overall therefore a dual communications technique is established. The software according to the invention can for example be part of an online banking software (for example an application), which runs on a mobile terminal. The SSMS communicates with the online services or the servers providing these (or is a part of this server). The communication channel between the software and the SSMS is thus different from the conventional communication channels used for accessing the online services (which in the state of the art are considered to be "secure"). Of particular advantage here is that generic attacks on these conventional communications channels have no effects on the security of the communication channel between the software and the SSMS (since for example the protected certificate store of the software is not affected by such attacks).

Embodiments of the software according to the invention provide, together with the SSMS, one or more of the following functions:

The software has an inbuilt secure link to the dedicated SSMS (thus for example the SSMS, where it is registered).

The SSMS has all information on the registered software and performs the control functions described above.

The SSMS can personalise the software remotely (for example with user-specific information).

The SSMS encodes and protects the private data of the software.

There is end-to-end encryption and authentication on this second communication path (between the software and the SSMS).

These functions prevent man-in-the-middle attacks and ensure the confidentiality and integrity of the data. Online service providers (for example a bank) can for example require login and/or transaction confirmations from the SSMS. The confirmation of the user and the verification are already integrated into this second communication channel.

Embodiments of the present invention have the following advantages over the authentication methods listed below:

The sending of SMSs (Short Message Service) with one-time passwords (OTP) as an alternative authentication method, where to send each SMS (even with a bundle) between 6-10 Euro Cent is payable and which can be spied out relatively easily by malicious software and/or undermined by SMS redirection or forwarding, can be avoided.

The use of software/applications for generation of one-time passwords (OTP) on mobile terminals as an alternative authentication method can be avoided. Such OTP software can for example be copied to other mobile terminals or computers and is susceptible to offline attacks, for example by debugging, reverse engineering and brute force attacks to find out the application PIN, which usually only comprises 4 or 6 digits (even if the OTP software blocks after 3 incorrect PIN entries, an infinite number of further copies of the OTP software are available for more tries). The OTPs used are generally not transaction-related and therefore susceptible to phishing, pharming, man-in-the-middle attacks and man-in-the-browser attacks. If the OTPs are transaction-specific, the transaction data must usually be entered twice by the user, once on the computer, on which access to the service provider takes place, and once on the mobile terminal, on which the OTP is then generated. This is susceptible to faults and is not very user-friendly.

The use of dedicated hardware tokens (for example TAN generators) can be avoided also. The need for such an additional device is perceived at least as bothersome compared to the use of for example a mobile telephone which also has other uses. Basically such hardware tokens are subject to the same problems as the OTP software. In addition OTP solutions are often based on symmetrical encryption, so that the key must at least be present on the verification server and theoretically can be tapped there.

The issue of software certificates for mobile terminals by the online service provider, the implementation of which is cost-intensive and complicated (in particular with regard to the issue and verification), is avoided. With software certificates again there is a danger, similarly to OTP software, of attackers accessing the system-wide certificate store of the mobile terminals (thus the certificate store already present when the device is delivered) and/or copying secret keys.

Example embodiments of the present invention use neither SMS nor OTP software. Instead secure digital certificates are used as user certificates, which however do not have to be issued and verified by the service provider (for example a bank), for this task is taken on by the SSMS. Thus one or more of the following advantages is obtained:

The user certificates are based on asymmetrical (secret and public) cryptographic keys. Only the user is in possession of the unique secret key (in encrypted form), and there is no copy of the secret key on the SSMS (nor on any other server).

The SSMS has an inbuilt certificate authority (CA) for issuing user certificates. The core software components of this CA originate for example from a Common Criteria (CC) EAL 3+ evaluated trustcenter solution. There are no further costs for each user certificate.

The SSMS can issue user certificates for each registered software according to the invention, wherein no user information is collected and also no complicated roll-out process has to be implemented and managed. The rollout of the certificates takes place seamlessly for the user and the online-service provider. The certificates contain the respective public key of the asymmetrical pair of keys, which is generated in the respective software according to the invention, are signed at the SSMS based on the CA and then for example issued to the respective software according to the invention or to other entities.

Both components (SSMS and software according to the invention) can send signed (authentic) messages to the other and verify digital signatures accordingly.

The software according to the invention contains an inbuilt certificate store for certificates from trusted Certificate Authorities (CA) and/or for personal certificates.

Local data of the software according to the invention can be encrypted with a unique key, administered on the assigned SSMS (for example on the mobile terminal). The encrypted local data can for example comprise a secret key of the mobile terminal, which is intended for the communication of the mobile device (for example for an authentication in the context of this communication). Optionally the certificate store can also be encrypted.

In embodiments of the invention online service providers can make use of the advantages of the invention, by using software according to the invention (for example as part of more extensive application software that serves to access the application server of the online service provider, for example an online banking application) in mobile terminals and with the application server communicating with the SSMS, if a login and/or transaction procedure has to be confirmed. The application server and the application software then communicate on a business process-related logic layer, while the software according to the invention and the SSMS introduce a security-related layer dual to the business process-related later and communicate on this.

The software according to the invention can for example be provided in the context of a software development kit (SDK) and then used by developers to adapt existing application software or to create new application software.

The client-side interface comprises for example just a few basic function calls, which simply have to be integrated into the application software. The SDK can for example comprise a binary library and a source code for demonstration of the different function calls. The communication takes place by means of an asynchronous interface, which does not block the application software while the security functions are being performed.

The server-side interface can for example be created using the Simple Object Access Protocol (SOAP), which is independent of programming languages. The SSMS is for example a separate server, which should run in a secure environment. When a confirmation to a login or transaction procedure is required by the SSMS, this can for example take place via a SOAP query from the application server to the SSMS. The SSMS can also generate an activation code for user registration, which can be requested by the SSMS by means of SOAP queries from the application server.

In example embodiments of the invention the SSMS provides unique one-time activation codes for each mobile platform. If a user accesses the online services with various devices, he will receive for example activation codes for each of these devices in their own right. The activation codes can be distributed by the service provider—depending on their internal security guidelines—for example to the end users by printed media (letter, etc.), by SMS to pre-registered mobile telephone numbers, via call centres (once the called user has correctly answered predefined security questions), via branch offices (face to face), or via an Internet site, on which the user has successfully performed self-authentication (for example with their authentication used previously, for example static password, OTP, SMS, soft OTP, etc.).

In embodiments of the invention—for example using the SDK—a generic application software is generated as an "application" or "App" with the software according to the invention embedded and pre-configured therein, and is uploaded to one or more Application Stores. The software according to the invention (as part of the application software) is for example preconfigured for a certain SSMS URL address. As the trusted server certificate, in the software according to the invention (for example in its certificate store) for example the certificate of the server, which is hosted and administered by the online service provider (for example a bank), can be preconfigured. The user downloads the application software with the software according to the invention from the Application Store. In order to increase security it can be provided that the user together with the activation code is informed of the legitimate link where he can download the application software. If the incorrect application software is downloaded, the SSMS can detect this and stop the communication with the user.

As described in more detail in the following, in order to use the application software with the integrated software according to the invention for the first time, the entry of the activation code and the definition of a PIN (or a password) by the user is required. All further registration, entry and personalisation processes run automatically and seamlessly from the point of view of the user. The PIN is stored on the SSMS and verified there each time the user restarts the application software, in order to perform self-authentication. It is not stored on the mobile terminal of the user, however, not even in encrypted form. Multiple incorrect entries of the PIN lead to the blocking of the user account on the SSMS, so that in the event of theft of the mobile terminal neither the use of the authentication function of the mobile terminal nor the extraction of the PIN is possible. If the PIN is lost following a rerun of the security check for example an activation code can be sent to the user (on the abovementioned channels).

Following entry of a valid PIN all registration processes at the SSMS and the security check of the application software is automatically performed by the SSMS. If then for example login or transaction procedures have to be confirmed by the user, the user is displayed corresponding authentic text for confirmation or rejection on the mobile terminal. In the event of confirmation this is signed by the software according to the invention using a secret key and sent to the SSMS, which verifies the signed message and informs the application server of the confirmation. The signing and verification processes run seamlessly from the point of view of the application server. In the case of risky transactions if necessary re-entry of the PIN by the user can be requested.

In embodiments of the invention the following concept applies:
- software (e.g. in the form of an application) is downloaded from a server, for example an Application Store (App Store), to the electronic device;
- the SSMS is used as a security anchor for the software;
- local data (with respect to the electronic device) of the software are encrypted with a key (for example an AES key), which is received by the SSMS during the session (the local data can for example be a part of the software, for example part that at least partially implements an online banking functionality; alternatively or additionally, the local data may comprise a secret key for authentication, signing and/or encryption);
- each time that the software is used or started an authentication in relation to the SSMS takes place;
- the software can, at least partially, be hardened—inter alia against reverse engineering.

FIG. 1 is a schematic representation of the components of an example embodiment of a system 1 according to the invention and an example sequence of the interactions between the components. Here a distinction is made between an initial activation phase of the software/application (shown on the left side) and a phase in which the software/application is used (on the right side).

The software is for example downloaded from an App Store 4 to the electronic device 3 and there, for example, at least partially initialised. Part of the software (e.g. starter software) is provided for executing and/or controlling steps (2) and (3). This part of the software (or another part) can likewise execute and/or control steps (1') and (2'). A further part of the software can then for example execute and/or control step (3').

The software first sets up a secure link (for example an SSL link) between the electronic device 2 and the SSMS 3. The server-side authentication (of the SSMS 3) is based here for example on a hard-coded certificate (which for example is stored in the electronic device 2 (for example this certificate has been installed with or by the software on the electronic device) and can be used for checking a certificate of the SSMS), and the client-side authentication (of the electronic device 2) is based for example on an activation key (which for example can be received by post or e-mail) or a PIN, which for example can have been set during the activation. The PIN and activation basically have a similar function here, but at different points in time: during the initial login the user carries out self-authentication with the activation code. This is valid only once and then expires. In the same step the user must also define a PIN (this is passed to the SSMS along with the activation code), which from now on has to be used for all future accesses.

The software stores at least part of the data (for example software for communication with the bank 5, or data, which uses this software for communication with the bank 5, such as for example a secret key or a certificate) in encrypted form (e.g. based on a symmetrical or asymmetrical encryption), for example by means of AES encryption. The key originates from the SSMS 2 (step (3)) and is never stored locally in the device 3. The software can only decrypt the data if it has logged in at the SSMS 2.

During the activation phase a client certificate is generated in the software and signed by the SSMS 2 (step (3)). This certificate is for example used for online banking with a bank 5. The associated secret key never leaves the software (and the device 3). It is for example encrypted with the AES-key in the device 3 and stored there.

Whenever the software is used or started a login at the SSMS 2 takes place (step (1')), in order to receive the key (step (2')). The SSMS 2 can for example carry out a version check regarding the version of the software on the device 3 and update or block out of date software. Further checks by the SSMS 2 are also possible, for example concerning the integrity of the software, the version of the software, whether the software is installed on the (correct) electronic device 3 and/ or if the user access rights provided by the manufacturer for the electronic device (for example regarding the authorisation of the user, to install and/or change programs on the electronic device) have remained unchanged (jailbreak detection). Due to the need for a login a complete control by the is given.

Figure 2:
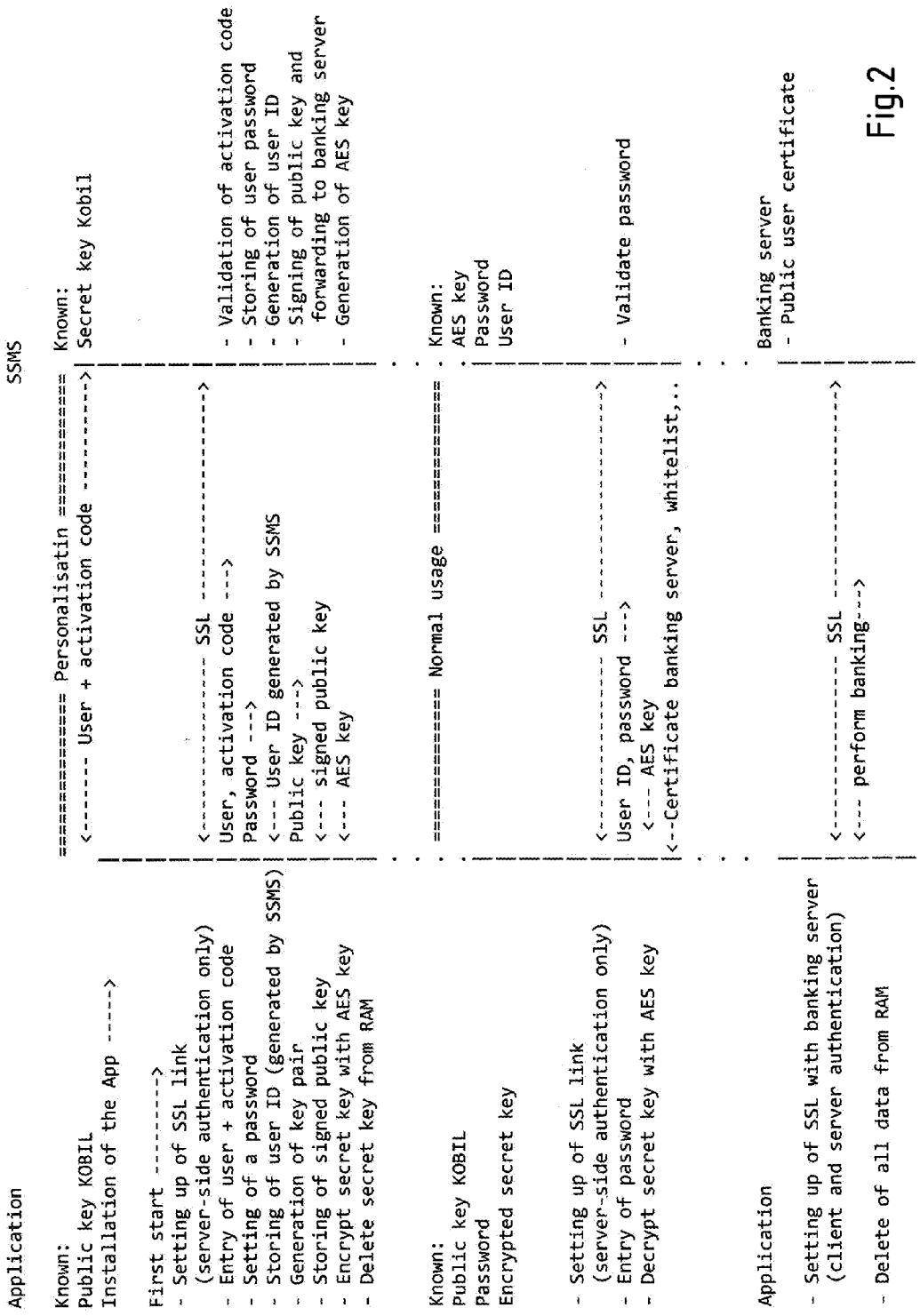
FIG. 2: an example of a sequence of a method according to the invention.

The sequence of an example method according to the invention is shown in FIG. 2, wherein initially a personalisation phase for the software is assumed. In this phase the software is installed and started for the first time (e.g. by unencrypted starter software). Here to begin an SSL/TLS-link with (for example merely) server-side authentication is established. For this the SSMS sends the software a certificate that the software can check with the public key (KOBIL) that is present there (alternatively a certificate from the SSMS may also already be present in the software (for example in the certificate store for trusted certificates), a check can then be dispensed with).

With the public key from the certificate the software then encrypts a session key, upon which the encryption of the data of the SSL link is based, and sends the encrypted session key to the SSMS. The SSMS decrypts the session key with the associated secret key that is present there. This completes the authentication of the server. The public key (KOBIL), which is stored in the software, functions here as a trust anchor. The software must therefore essentially only recognise the public key KOBIL or the associated certificate and not the certificate of each SSMS server instance, to which the software may be linked. By way of example, if the certificate of the SSMS sent by the software (which for example contains the public key of the SSMS) is signed with the secret key (KOBIL) of the KOBIL ROOT CA, then the software can check the validity of this certificate with the public key KOBIL. Then software can then be advantageously used with various SSMS servers, provided that these use SSMS server certificates, which are signed with the secret key (KOBIL) of the KOBIL ROOT CA.

In the certificate of the SSMS, that is sent to the software, instead of the public key of the SSMS for example a public key, especially generated for the encryption of the session key, of an asymmetrical pair of keys can be generated and signed by the SSMS (for example with the secret key (KOBIL), for example, in order to avoid that for each setting up of a secure link the same key is used for encryption of the session key. Alternatively the SSMS can also generate a subcertificate with a public key for use in encryption of the session key and sign it with the secret key of the SSMS. Checking of the validity of this subcertificate can then take place using the certificate of the SSMS in the software, which in turn can be checked using the public key (KOBIL).

In the software a pair of keys comprising a "public" and a "secret" (or "private") key is generated (for example an RSA pair of keys (according to Rivest, Shamir, Adleman)). The public key is signed by the SSMS (e.g. with the secret key (KOBIL) or with the secret key of the SSMS) and for example passed on to the banking server described below. Alternatively the public key remains in the SSMS. In this way the SSMS can therefore generate the user certificates based on the KOBIL ROOT CA (with the respective public key of the software), which can be used for authentication of the software, for example of the banking server or other servers which trust the KOBIL ROOT CA.

The secret key is encrypted in the device with a key, here by way of example an AES-key, generated by the SSMS. In addition parts of the software itself may be encrypted with the key, so that these parts are only executable if the key has been received from the SSMS. This ensures that even if the software is read out, reverse engineering is made difficult, since it is at least partially encrypted and the key is also individual (related to the device and/or the user).

In the "normal usage" phase prior to actual use of the software (here for example online banking with a banking server) a link is set up with the SSMS, in order to receive the AES key for decryption of the encrypted secret key (and any encrypted software parts) in the device (for example by unencrypted starter software). Furthermore, optionally here further information such as a certificate from the banking server and/or a whitelist can be received.

The secret key is then used in the communication (for example for encryption/signing of messages) with the banking server (which for example has previously been sent the public key signed by the SSMS, belonging to the secret key). In the present case an SSL/TLS link with client- and server-side authentication is set up, for example according to the Request for Comments (RFC) Document 5246 "The Transport Layer Security (TLS) Protocol Version 1.2". The authentication of the banking server in relation to the software is based on the certificate of the banking server, which the software has previously (optionally) been sent by the SSMS. This certificate can for example be signed by the SSMS (or by another entity) (for example with the secret key (KOBIL) and then checked using the public key (KOBIL) present in the software (for example in its certificate store for trusted certificates). Alternatively the certificate of the banking server can also be signed by another entity, provided that the software in its certificate store for trusted certificates has a corresponding public key for checking the signature. As further alternatives the certificate of the banking server with its public key can also already be stored in the certificate store for trusted certificates of the software, and then no further check of the certificate is necessary. The authentication of the banking server can then for example take place by the software encrypting a session key (or a random number, from which the session key is derived) with the public key of the banking server (from the certificate) and the banking server can only decrypt this encrypted information with its secret key.

The authentication of the software is based on a certificate, which contains the public key generated in the software. This certificate has been previously signed by the SSMS and sent to the banking server, as described above. By way of example, the software can sign information (for example a challenge or other session-specific information received from the banking server) with the secret key. The signature can then be checked by the banking server using the public key from the certificate received from the SSMS and thus the software be authenticated.

Additionally or alternatively the secret key can also be used for communication with the SSMS, for example for setting up a secure (for example encrypted) link (for example an encrypted link, which at least is based on client-side (and preferably also server-side) authentication, for example an SSL- or TLS-link with client- and server-side authentication), and/or for the signing of messages (with the secret key), which are sent to the SSMS. If messages signed by the device 3 are sent to the SSMS, for example for confirmation of a login or transaction procedure, these signed messages can for example be archived in the SSMS or in the banking server, in order to have evidence at a later point of the confirmation of the login or transaction procedure. The secret key can additionally or alternatively also be used for encryption of messages sent to the SSMS.

Here the software ensures that the secret key (and the AES-key) after successfully being used is deleted again (it can however, for example after a repeated request for the AES key, be decrypted again and used by the SSMS). The secret key can for example only be stored in the RAM, and not in the FLASH memory. The deactivation of this function can be prevented by suitable hardening of the software.

From the user point of view therefore there are two different use scenarios:
1. Activation
   Takes place once per installation of the software on the device.
   The activation key is for example received by post or e-mail.
   The software is installed on the device.
   The activation key is entered.
   A PIN (password) is selected and entered.
2. Starting of the Software
   Takes place whenever the software is started or restarted.
   Entry of PIN (password).
   Use of software functionality (for example online banking).
   Obtaining, as necessary, of updates via an Internet server (e.g. an App Store).

Compared with known solutions with soft certificates embodiments of the invention have the advantage, amongst others, that through implementation of a counter for incorrect PIN entries on the SSMS brute force attacks can be avoided. For unlike the devices, upon which the software is operated, the SSMS is secured against manipulation. In particular resetting of such a counter is only possible on the device but not on the SSMS. Additionally or alternatively on the SSMS a wait time can be defined (which cannot be manipulated by an attacker) which must be allowed to elapse after an incorrect password entry before a password can be entered again, which makes brute force attacks considerably harder, for example of the order of a few minutes or hours (for example at least 5 or 10 minutes waiting time).

In addition the invention allows critical data to be protected. This is achieved in the embodiment described above in that the secret key and/or at least parts of the software are encrypted with an AES key, which is provided by the SSMS only in an existing SSL session. No offline attacks are possible, therefore (for example if the device is stolen).

The software/application can for example comprise a number of components, which either form a software package (for example an application that is downloadable from an App Store) or at least in part are present separately. By way of example, an unencrypted starter or loading program can be provided, which serves to set up the link with the SSMS, perform the authentication in relation to the SSMS and receive the AES key from the SSMS. A further component of the software can then be intended for the actual communication of the device (for example with a further unit such as an online banking server), and to this end be encrypted with the AES key, so that it can only be used after decryption. This component can for example comprise a browser, which for example can be hardened. This communication component can of course also contain a graphical user interface and further components which are necessary for running the actual communication application (for example online banking), not just the pure communication components. A further component of the software can be intended for performing the activation phase (see FIGS. 1 and 2) and be present unencrypted for this purpose. Individual or all of these components of the software can be hardened.

The following scenarios are thus for example conceivable:
1. Downloading an unencrypted starter application from an App Store. This carries out the activation code procedure and receives the AES key from the SSMS and—if necessary from another server also—the actual communication program that is encrypted with the AES key (on the SSMS) or is to be so (on the electronic device).
2. Downloading of a complete application (starter application+communication program). The AES key is received using the starter application from the SSMS, and in this way the communication program is then individually encrypted.

The software can in particular be designed as at least partially hardened software; it can for example comprise a hardened browser. By way of example a URL whitelist (a list with only URLs that may be accessed) may be contained. Additionally or alternatively a fixed home page may be used only.

A user access control takes place whenever the software is started. With each start a version control and further controls, for example concerning the integrity of the software and/or the coupling of the software to the correct device and/or the need for an update, may also be carried out.

Optionally in embodiments of the invention a hardware component is used. This can, for example instead of the software/application, store a secret/private key or allow access to this (for example if this is stored on a smartcard), but for example only when a PIN is entered. The hardware components can for example have a cabled (e.g. via USB) or wireless (e.g. via Bluetooth) connection to the electronic device. In the case of a Bluetooth communication this can be encrypted or unencrypted. Here the hardware component can be rechargeable, for example via USB (including when the connection is via Bluetooth).

The hardware component can for example allow a secure PIN entry, especially if it is designed as a class 3 reader. By way of example an SSL certificate (e.g. the SSL certificate used in the context of the communication with the SSMS server) can be stored on a certified smartcard, which can be read with the hardware component. Verification of transaction data can take place on an additional display (for example of the hardware component). The hardware component can be used for implementation of a two-factor authentication (for example smartcard+PIN).

The hardening methods used in the embodiments of the invention are for example specific to the respective underlying platform (e.g. iOS or Android in the case of a Smartphone). Here for example external (commercial) hardening products can be used, for example EnsureIT from Arxan or Netheos solution.

A relatively small, unencrypted loader program can be used and then the actual software dynamically decrypted and loaded. Then, potentially, loading from the Internet is possible. The downloading of programs may not be permitted on some platforms, however.

Configuration data for the software/application can for example be stored in a persistent memory and thus for example protected against manipulation.

Code obfuscation can be used to protect the software from reverse engineering.

In embodiments of the invention the invention can be used to replace the established mTAN procedure, with the SMS-based communication channel of the mTAN procedure being replaced by the SSL-based Internet channel of the present invention. This can serve as a basis for a security matrix, with which users can decide which security solution is secure for the respective application scenario.

FIG. 3 shows an example application scenario of the invention. Here a user interacts with a personal computer (PC) 6, on which a hardened browser with permanent certificates for internet-banking (for example for authentication of the banking server) is used. The hardened browser can for example be contained in a CD-ROM partition of the PC 6 in preconfigured form and be inalterable. Here the PC 6 communicates via an SSL-connected link 8 with a banking server (not shown).

The user also interacts with a Smartphone 7, on which a software according to the invention (for example an application (or App)) is installed. The application is hardened and is also set up to display transaction data and transaction TANs. It communicates via an SSL link 9 as already described for FIG. 2 with the SSMS. The TANs can then be received on various paths. By way of example the TAN can be received from the SSMS (via the link 9), once the user of the Smartphone 7 has carried out self-authentication on the SSMS, has received the AES key and thus has decrypted data in the Smartphone 7 (for example parts of the software/application, which are necessary for obtaining the TANs and/or a secret key). Alternatively following authentication on the SSMS and receipt of the AES key a communication with a banking server (which may be identical to or different from the banking server with which the PC 6 communicates) can be started, for example based on part of the software, which could only be decrypted with the AES key and/or a secret key (e.g. for authentication in relation to the banking server and/or for encryption of the communication with this), which could only be decrypted with the AES-key.

The TAN received in this way can in turn be entered by the user on the PC 6, in order there to authorise an online banking action, such as for example a remittance, which is initiated with the hardened browser.

The online banking in this example is thus based on at least two separate channels. Firstly, the SSL-based communication channel 8 between the PC and the banking server, via which the transactions are initiated, and secondly the SSL-based communication channel 9 between the Smartphone and the SSMS. The user functions as the link between the two channels.

The communication channel 9 between the Smartphone and the SSMS or the banking server, from which the TAN is obtained, then takes the place for example of the conventional SMS-based mTAN channel 10, which however can be attacked and compromised by Trojans on the Smartphone 7, which are able to listen in on and/or change the unencrypted SMS communication 10.

Figure 4A:
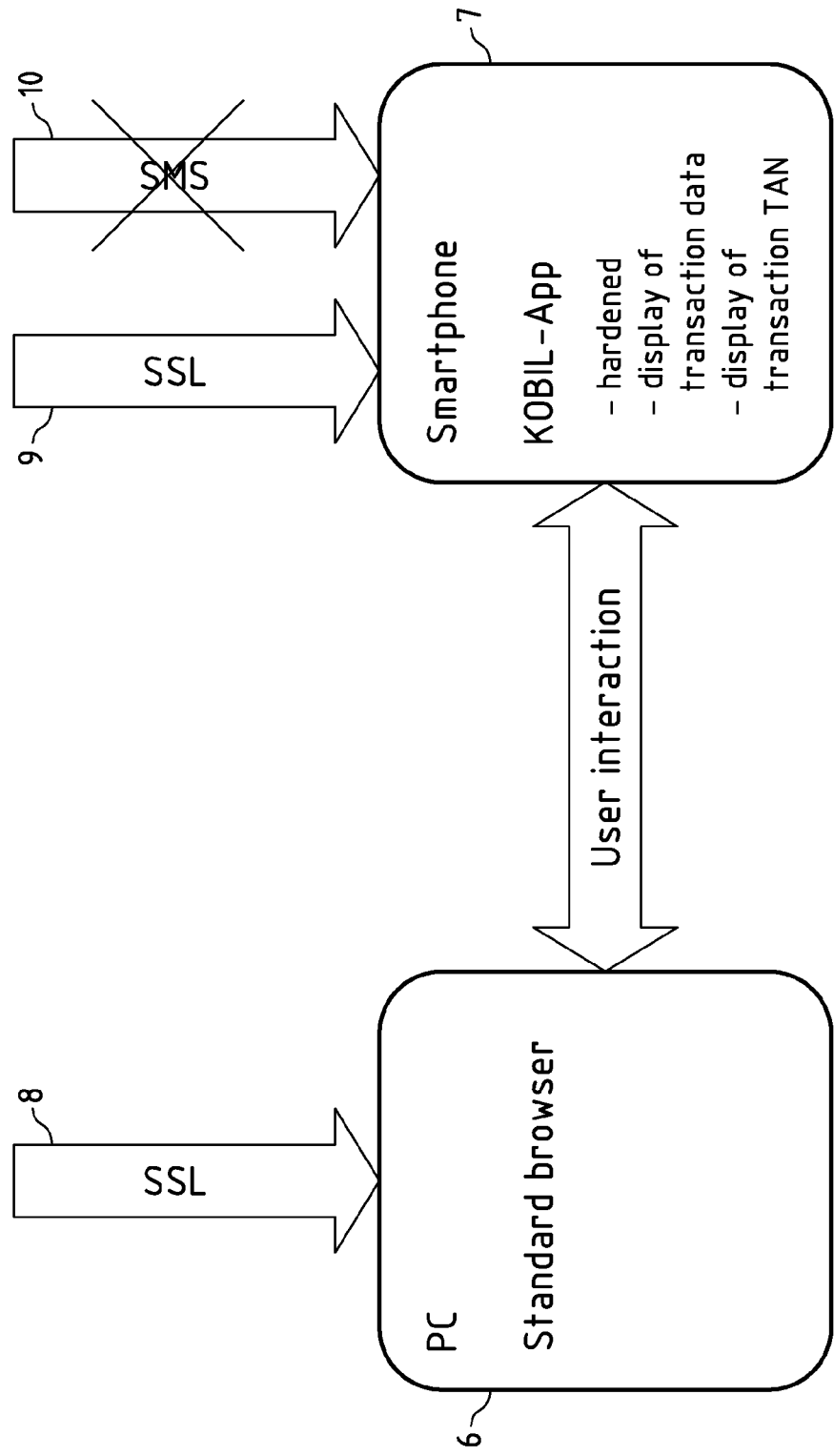

FIG. 4a shows a further example of an application scenario of the invention, which corresponds extensively with the scenario from FIG. 3. Unlike the scenario from FIG. 3, however, the PC 6' is a PC that is not fully controlled by the user. By way of example on the PC 6' just a non-hardened browser can be used for online banking. This can, for example, be the case if the PC 6' is located in an Internet café. The communication channel 8 of the PC with the banking server is then easier to break than when a hardened browser is used (see FIG. 3). As in the scenario of FIG. 3, however, the introduction of a separate communication channel 9 for transmitting the transaction TANs to the user using the hardened application, which communicates with the SSMS and only after successful authentication in relation to the SSMS for example allows the application to be used for receiving the transaction TANs, contributes to an increase in security.

Figure 4B:
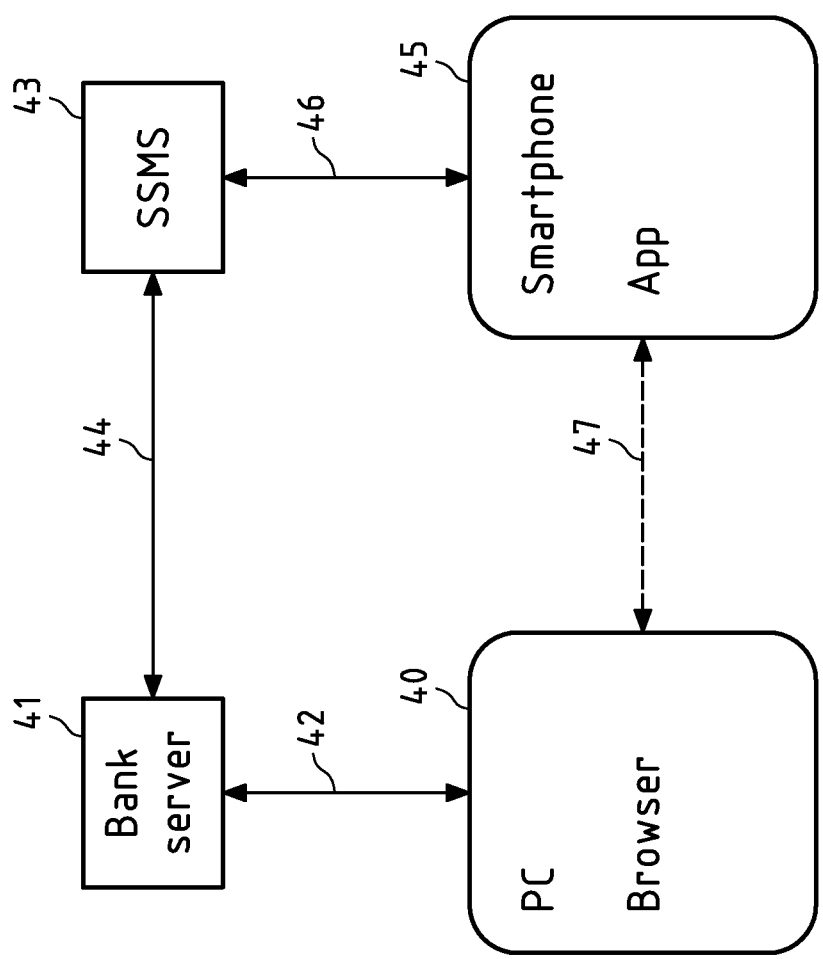

FIG. 4b shows a further application scenario of the present invention. FIG. 4b concerns an out-of-band authentication solution for PC-based access to online applications. The authentication solution can for example be used for confirmation/rejection of logins and/or transactions (for example remittances). Amongst other things here the weaknesses and high costs of SMS-based authentication solutions and the weaknesses and susceptibility to error of soft one-time-passwords (OTPs) generated on mobile devices as an authentication solution are avoided.

In the scenario of FIG. 4b a user interacts with a Smartphone 45, on which a software according to the invention (for example an application (App)) is installed. The application is for example hardened. As previously described the application can for example be downloaded from an application server (not shown in FIG. 4b) and then registered at the SSMS 43. Access to local data stored in the Smartphone 45 (in particular a secret key) is only possible if the user of the Smartphone 45 has carried out self-authentication on SSMS 43 (for example by entering a PIN on the Smartphone), whereupon the AES key is received in the Smartphone 45 and the local data are at least in part (for example at least the secret key) decrypted with the AES key (for example by the application). The secret key is for example used for signing of messages, which are sent from the Smartphone 45 to the SSMS 43. Between the Smartphone 45 and the SSMS 43 there is preferably a secure link 46, for example an SSL link. To set up this link 46 the secret key can likewise be called upon. By way of example when setting up the link 46 information (for example a challenge from the SSMS or other, for example session-specific information) is signed with the secret key on the Smartphone and then verified on the SSMS with the associated public key.

The user also interacts with a browser (or another application, for example a piece of online banking software) on a PC 40 (or another Smartphone), which is connected via a link 42, for example an SSL link, with the server of a bank 41. By way of example via the browser or the application on the PC 40 a login on the server 41 takes place and/or a transaction is performed with the server 41. The user can now be authenticated when logging in or performing transactions by means of out-of-band communication based on the application on the Smartphone 45, as described in the following.

Initially the user logs in, by entering their user name and password (or alternative authentication information, such as for example biometric data) on the PC 40, to the server 41, for example through an online portal provided on the server 41 that allows online services.

The user or their login can now for example be further authenticated (on a separate out-of-band channel) in that the server 41 via the link 44, which for its part can be a secure link, requests from the SSMS 43 a login confirmation. Thereupon the SSMS 43 sends via the secure link 46 a secure message to the application in the Smartphone 45. Information is then displayed on the Smartphone 45 to the user relating to his login to the server 41, for example in the following form: "Do you really want to login to the X service of the Y server?". On the Smartphone 45 the user can confirm or reject this information (for example via the keypad or through voice recognition). The confirmation or rejection of the user is then sent to the SSMS 43 (for example signed with the secret key), which returns corresponding information to the server 41 and thus confirms or does not confirm the login by the user to the server 41.

Alternatively the SSMS 43 when asked for the login confirmation by the server 41 can generate a code, for example a one-time code (for example a short code, which for example has less than 6, 5 or 4 digits, in order to simplify the later entry by the user), and send this via the secure link 46 to the application in the Smartphone 45. On the Smartphone 45 the code is then displayed to the user. The user then enters this code for example via the keyboard of the PC 40 (or for example by direct transmission, for example optically, acoustically or via radio, in particular via an NFC or Bluetooth link) on the PC 40, which then sends this information via the link 42 to the server 41. The server 41 then sends the code via the link 44 to the SSMS 43 for verification. If the code received from the server 41 matches the code sent to the Smartphone 45, the login of the user to the server 41 has been (further) confirmed, and corresponding information can be output from the SSMS 43 and the server 41. Otherwise the (further) authentication of the user has been unsuccessful.

In both the above-mentioned processes for further authentication of the user a condition for transmission of messages between SSMS 43 and the application on the Smartphone 45 is that the user of the Smartphone 45 has carried out self-authentication on the SSMS 43 (for example by entering his PIN on the Smartphone 45) and therefore has decrypted the secret key stored in the Smartphone 45 so that this can be used for secure data transmission with the SSMS 43.

Similarly to that described for the login process of the user on the server 41 (via the PC 40), transactions which the user performs via the PC 40 on the server 41 can also be confirmed via the separate out-of-band channel that is formed by the SSMS 43 and the application in the Smartphone 45, thus for example by displaying information on the Smartphone 45, by which the user is asked to either confirm or reject a transaction performed on the server 41 via the PC 40, or by sending a code from the SSMS 43 to the application of the Smartphone 45, which must be entered by the user on the PC 40 or otherwise sent from the Smartphone 45 to the PC 40, in order to confirm the transaction. Here the code can for example represent the transaction number (as in the example of FIGS. 3 and 4*a*), or may be necessary in addition to a transaction number, which for example has been sent to the user via another path (thus not via the link 46).

The display of information, which originates from the SSMS 43, on a display unit of the Smartphone 45 can for example take place by means of secure and/or hardened display software, which is provided or at least controlled by the application on the Smartphone. By way of example the display functionality (for example the WebView component of an Android operating system) of a browser can be used which is (already) installed on the Smartphone 45.

Figure 5A:
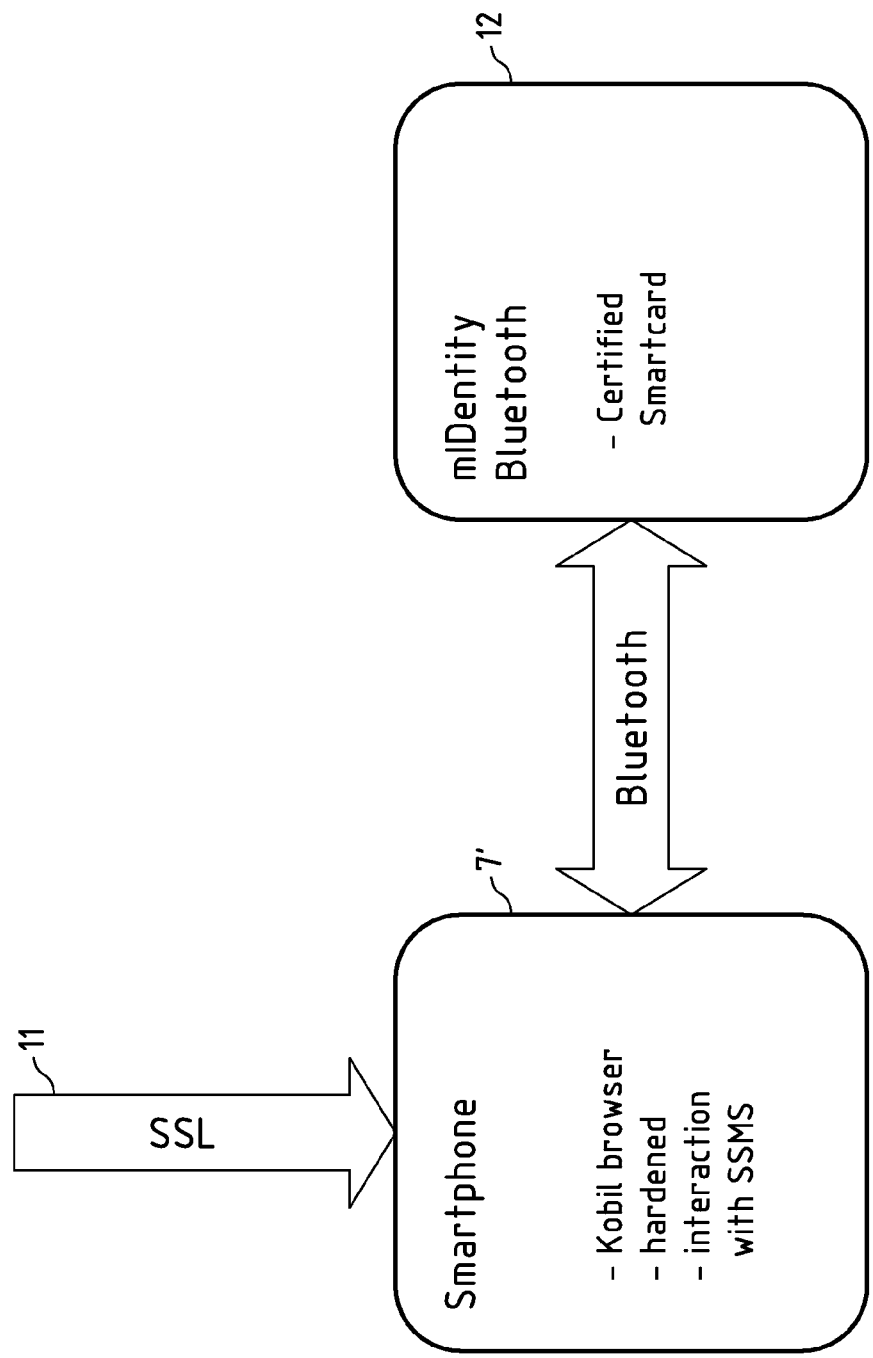

FIG. 5*a* shows a further example application scenario of the invention. Here the Smartphone 7', on which the application according to the invention is installed, is used directly for online banking (without an additional PC 6/6' as in FIGS. 3 and 4). To this end the application for example contains a hardened browser for communication (via the SSL link 11) with the banking server and is also set up for interaction (likewise via the SSL link 11 or an additional SSL link) with the SSMS, as has been described in connection with FIG. 2.

FIG. 5*a* shows a further optional hardware component 12 for performing a two-factor authentication, which by way of example is connected via Bluetooth to the Smartphone 7' and can access a certified Smartcard. The Smartcard can for example store (for example instead of the device 7' or the software/application) the private/secret key (or generate this) and/or be used in connection with the authentication in relation to the SSMS thereby further increasing the security (compared with the use of a password). The hardware component 12 can also comprise a display for displaying information (e.g. transaction data and/or transaction numbers).

Figure 5B:
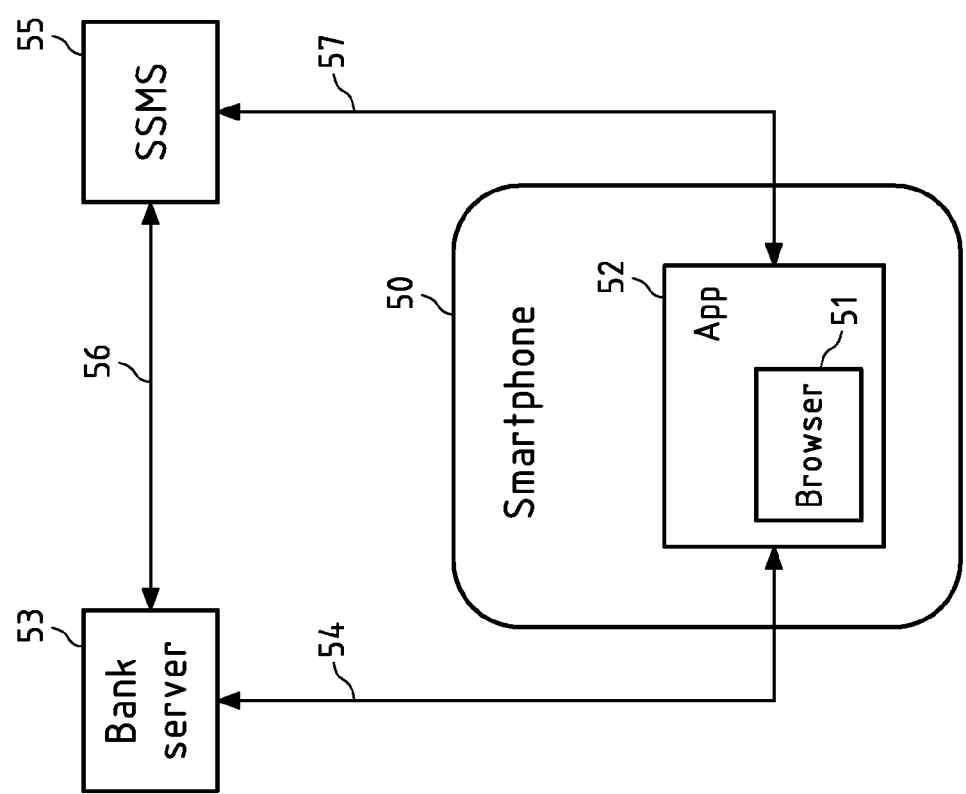

FIG. 5*b* shows a further application scenario of the present invention that increases the trustworthiness of actions performed on mobile terminals (such as for example login procedures or transactions). All current attacks on browsers that run on PCs can similarly also be directed at browsers that run on mobile terminals, in particular Smartphones. By way of example, users can be tricked by phishing or pharming attacks when accessing their online services, or man-in-the-middle attacks or man-in-the-browser attacks can be used in order to alter the actions of the user during execution of these. Here the conventional use of static passwords, or soft one-time passwords (OTPs) generated on the mobile terminal does not offer sufficient protection.

In the embodiment of FIG. 5*b* a user interacts with a Smartphone 50, on which software according to the invention 52 (for example an application (App)) is installed. The application 52 is for example hardened. As described previously, the application 52 can for example be downloaded from an application server (not shown in FIG. 5*b*) and then registered with the SSMS 55. Access to local data stored in the Smartphone 50 (in particular a secret key) is only possible if the user of the Smartphone 50 has carried out self-authentication on the SSMS 55 (for example by entering a PIN on the Smartphone 50), whereupon the AES key would be received on the Smartphone 50 and the local data at least partially (for example at least the secret key) would be decrypted with the AES-key (for example by the application 52). The secret key is for example used for signing of messages, which are sent by the Smartphone 50 to the SSMS 55, and/or for setting up a secure link 57, for example an SSL link, between application 52 and SSMS 55. In order to set up this link 57 the secret key can likewise be used, for example for client-side authentication as described above.

In the present embodiment the application 52 comprises a browser 51. The browser 51 can be an integral component of the application 52, or can be run using the resources of a browser installed on the Smartphone 50 independently of the application 52 (for example of the standard browser of the Smartphone 50, which is preinstalled on the Smartphone when it is delivered). By way of example the browser 51 can take the form of a WebView component of a browser installed on the Smartphone (for example on a Smartphone 50 with Android operating system). Alternatively the application 52 can also not contain its own browser 51 and instead control a browser of the Smartphone 50.

The application 52 brings to the Smartphone 50 for example security mechanisms which are specific to the browser 51 and which for example at least partially control or restrict its use. These security mechanisms can for example comprise one or more of the following features:

- A URL (Uniform Resource Locator)—whitelist filter, thus a list of permitted URLs, which the user may call up with the browser 51. This prevents access to the wrong or bogus Internet sites.
- A secure certificate store (for example accessible only via the application) for certificates from trusted Certificate Authorities (CA) for verification of server certificates and for protection of SSL links. This can in particular be independent of the certificate store of the Smartphone 50.
- An integrated secure display for authentic messages (for example from the SSMS) to the user. This display can for example be designed by application developers, for example as a GUI component, or for example also by using the WebView component of the browsers 51 in the case of an Android operating system). The standard display of the browser 51 is not used for displaying important messages (such as for example login information or transaction information), only the secure display. The overall display of the application can then for example comprise the standard display of the browser 51 in an upper part and the secure display in a part beneath this.

The application 52 can for example be adapted to the requirements of an online service provider, whose services are to be accessed with the Smartphone 50. Adaptable constituent parts of the application 52 comprise for example one or more of the following components:

Background images of the graphical user interface.

Text resources (for example text which is displayed by the application. By way of example in this way further languages can be added or the terminology adapted to the linguistic usage of the respective customer.)

A URL for the standard online application and a URL whitelist filter.

SSL CA certificates as a trust anchor.

When a user uses the application 52, he is asked to carry out self-authentication on the Smartphone 50 in relation to the SSMS 55 (for example by entering his PIN). Thereupon, and as described above, the input information is verified on the SSMS 55 and a secure link 57 is set up between the SSMS 55 and the Smartphone 50 or the application 52.

The login process of the user at the server 53 of a service provider (in FIG. 5*b* for example assumed to be a bank) via an application—in this case an Internet page displayed on the browser 51—for logging in at server 53 can then for example begin in that the user enters his user name (for example an ID) and a for example static password in the browser 51 (for example via the keypad of the Smartphone 50). These data are verified at the server 53. Thereupon the server 53, via the link 56, requests an additional authentication of the user from the SSMS 55. The SSMS 55 sends for this purpose over the secure link 57 set up as above a secure message to the application 52 on the Smartphone 50. Thereupon information is displayed to the user on the Smartphone 50 (for example in the secure display of the application 52) concerning his login to the server 53, for example in the following form: "Do you really want to login to the X service of the Y server?". The user can confirm or reject this information on the Smartphone 50 (for example via the keypad or voice recognition). The confirmation or rejection of the user is then sent to the SSMS 55 (for example in the form of a message signed with the secret key), which returns corresponding information to the server 53 and thus confirms or does not confirm the login of the user to the server 53.

Alternatively the authentication of the user can also take place without entry of the username and password in the application (in this case by way of example an Internet page displayed in the browser 51) for login at the server 53. For this the SSMS 55 (for example in response to the starting of the application 52 on the Smartphone 50 and the authentication of the user in relation to the SSMS 55 via the application 52) generates a one-time code (which for example for security reasons can be relatively long (for example with more than 8, 16 or 32 digits), since it does not have to be entered by the user) and sends this (for example as an entrance ticket) via the secure link 57 to the application 52. The application 52 sends this code to the application, which is used for login at the server 53, for example automatically. By way of example the code is automatically entered in an Internet page displayed in a browser 51 for login to the server 53. The code is then sent by the server 53 via the link 56 for verification to the SSMS 55, which in the event of a match between the code generated and the code received from the server 53 returns information to the server 53, that the user has successfully carried out self-authentication (and therefore may use the service of the server 53). Since entry of username and password by the user in the application/browser 51 is no longer necessary, the user-friendliness compared with the previously described variants is further increased. The authentication of the user in relation to the server 53 here is thus based on the entry of the PIN for the SSMS 55 by the user (and optionally a check whether the application 52 has correctly registered on the SSMS 55 and/or is intact and/or is installed on the correct Smartphone 50).

In the same way as described for the login process of the user to the server 53 transactions which the user carries out via the browser 51 on the server 53, can in addition be authenticated via the separate out-of-band channel that is formed by the SSMS 55 and the application 52 in the Smartphone 50, thus for example through the display of information on the Smartphone 50, by which the user is requested to either confirm or reject a transaction performed on the server 53 via the browser 51, or by sending a code from the SSMS 55 to the application 52 of the Smartphone 50, which is then sent from the application 52 to the application/browser 51 (here also then the manual entry of the code in the application by the user can advantageously be dispensed with). Here the code can for example represent the transaction number (as in the example of FIGS. 3 and 4*a*), or may be necessary in addition to a transaction number, which for example has been sent to the user via another path.

The appearance of the software according to the invention/application (for example the user interface) can for example with the help of a configuration interface (for example a generic configuration interface) be adapted or altered, in order for example to allow branding for different banks.

Alternatively according to the invention a communications and security SDK (software development kit) for creating the software according to the invention/application can be provided, wherein the user interface of the software/application can then be defined individually by the users of the SDK (for example applications programmer for various banks).

As a further alternative the software/application can be set up so that a mask (a so-called "skin") that determines the appearance of the user interface during the activation/initialisation phase (see FIGS. 1 and 2) is loaded by the SSMS or from another server and then linked with the software/application. If the software/application is sold via an application store, then the software/application would in this store always be obtainable under the same name, since the bank-specific adaptation takes place only after successful downloading during the activation/initialisation phase.

Embodiments of the invention allow (for example unlike the conventional soft token method) the use of a counter for failed authentication attempts (for example incorrect password entries) on the SSMS (thus in a more secure environment than the device), so that brute force attacks are impossible and so also simpler passwords can be used. Simple passwords are in particular widely used on mobile devices since because of their small keypads these make the entry of complex passwords quite time-consuming. In addition local data of the software are encrypted on the device, so that malware on the device cannot read out any secret data (unencrypted).

If the device is temporarily stolen and its contents copied, any attacker faces the additional obstacle that any hardware values that may be in the hardened software have to be verified.

The requirement to login to the SSMS for each action allows inter alia a regular check of the version of the software and the forcing of updates. By way of example performing online banking may be prohibited if the version of the software is deemed to be out of date.

If the software according to the invention is designed as an application, which is installed on a Smartphone and is obtained via an application store (App Store), advantageously a number of security mechanisms of the Smartphone provider can be used, for example:

- The applications are checked before being included in the application store, for example for compatibility (e.g. with Apple).
- The installation of unknown applications (and so not originating from the application store) on the Smartphone is prohibited.
- Applications with malware can be deleted remotely from the devices.
- The operating systems of the Smartphones provide so-called sandboxes, and applications cannot interact with one another.

As explained previously, in embodiments of the invention a secret/private key (in the following also referred to as a "private key") for authentication, signing and/or encryption of the communication of the device can be used with another unit, for example a banking server. This key can be stored at various points, as described in more detail in the following. What is common to all scenarios, however, is that access to the (full) key and thus its use is only possible following successful authentication with the SSMS. In the following description of FIGS. 6-8 the (complete) key is used for authentication in relation to a banking server. Alternatively the secret key can however also be used for authentication in relation to the SSMS (for example when setting up a secure link, such as for example an SSL/TLS link or for the signing of messages to the SSMS), as has already been comprehensively described.

Figure 6:
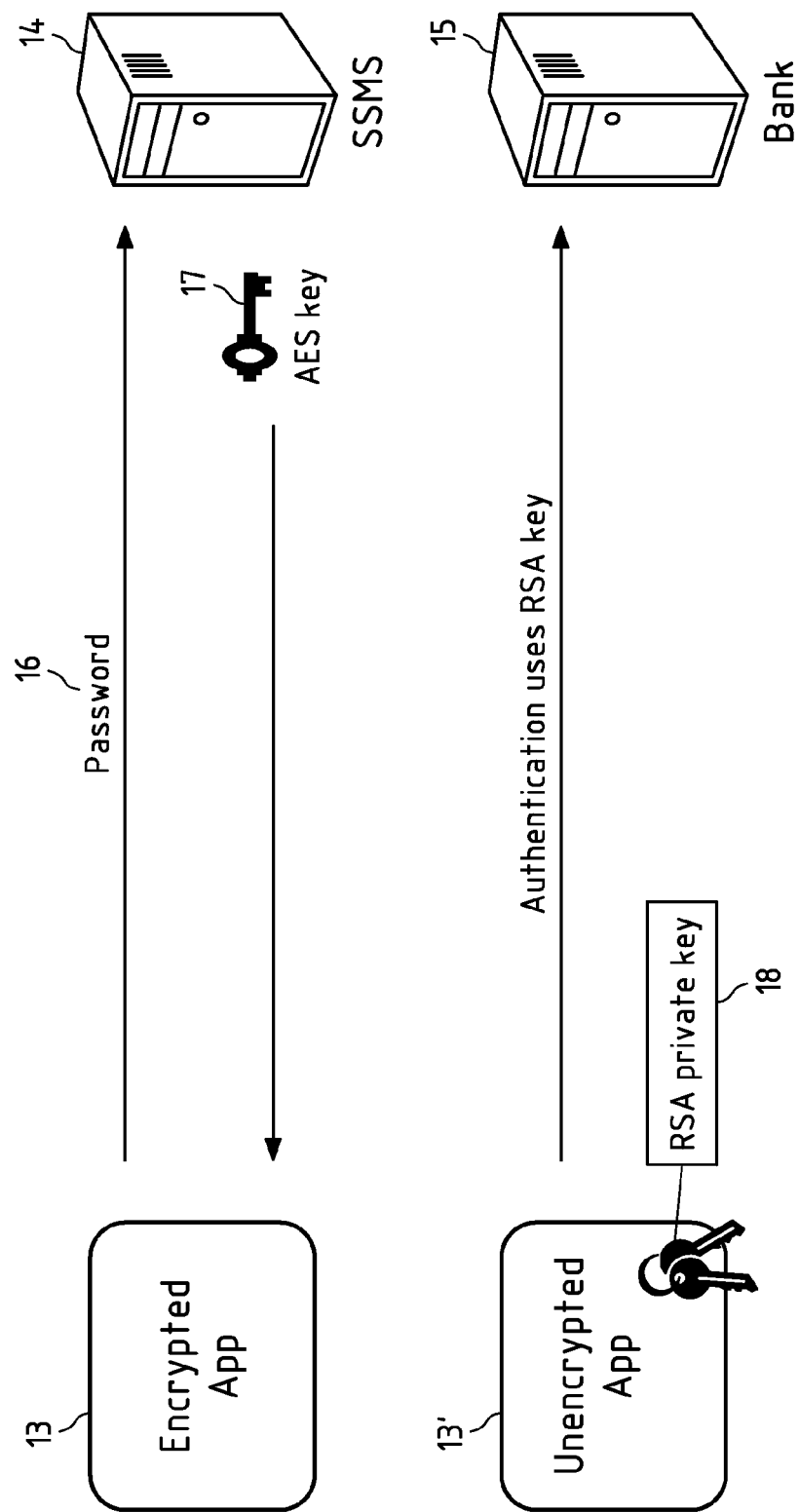
FIG. 6-8: example scenarios for the storage of a secret key according to the invention.

The private/secret key 18 can, as shown in FIG. 6, be stored in the software/application 13'. The key 18 is thus together with the software 13' symmetrically encrypted, in order to obtain the software 13. Access to the software 13' and also the private key 18 is then only possible following successful authentication with the SSMS 14 (via the password 16) and receipt of the AES key 17 (for decryption of the software 13). The private/secret key 18 is then used in the communication with the banking server 15 (or the SSMS) (for example for client-side authentication in the context of the SSL/TLS link, as for example described in the context of FIG. 2). Alternatively, of course, just the key 18, but not the software 13', can be symmetrically encrypted. Then access to the key 18 is dependent upon obtaining the AES key 17.

Figure 7:
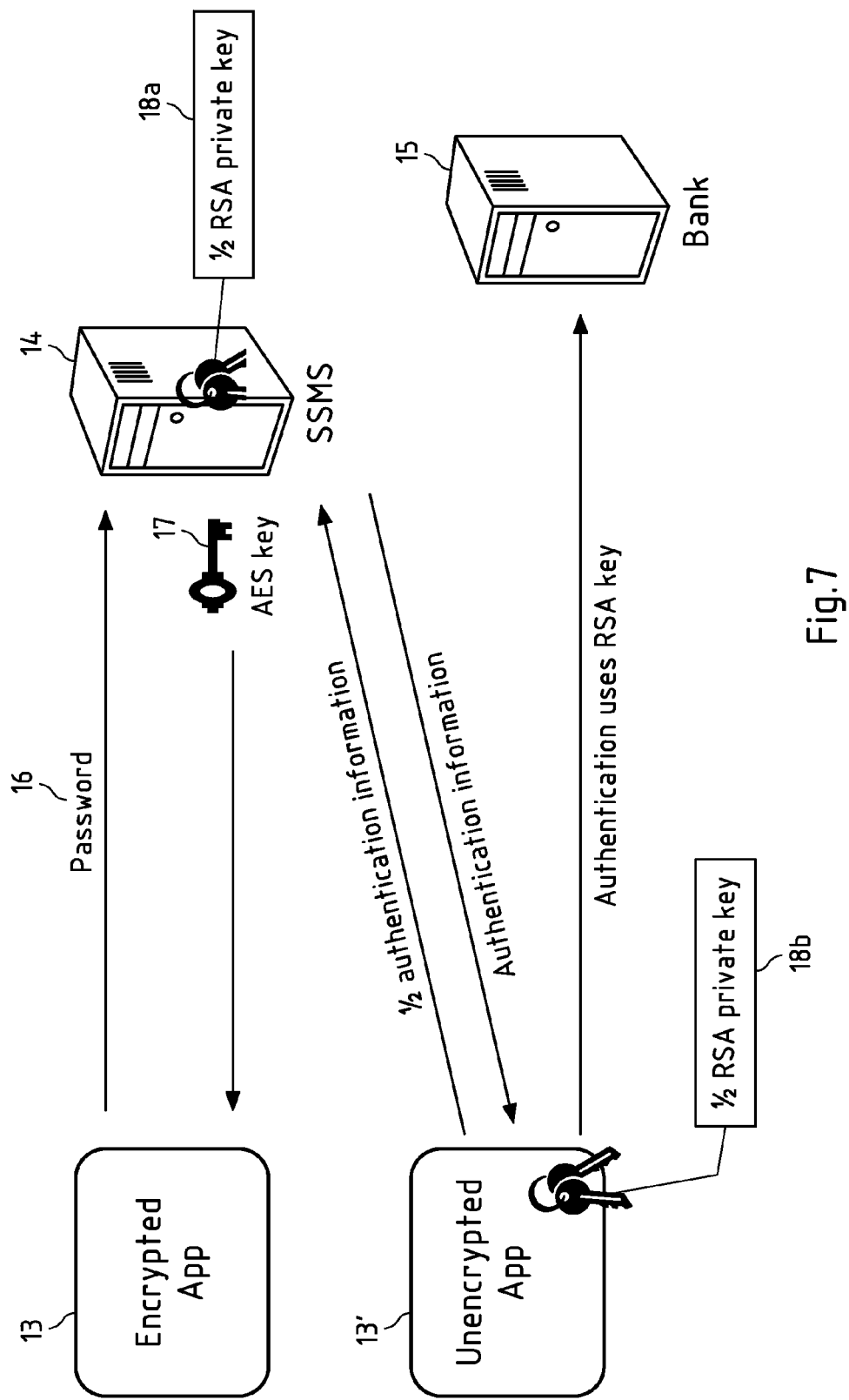

The private/secret key 18a/18b can also, as shown by way of example in FIG. 7, be stored in a distributed manner, and in fact as part 18a in the SSMS and as part 18b in the software/application 13'. Both the SSMS 14 and the software 13' must use their part of the key 18a/18b, so that a valid signature results, which can be checked using conventional methods. This offers security even if the software 13' is stolen or hacked. The administrator of the SSMS 14 cannot carry out any attack with the partial key 18a, the software 13' or the key 18b contained in this must always be involved (and also the software 13' decrypted). Here also alternatively just the key part 18b, but not the software 13', can be symmetrically encrypted. Then access to key part 18b is dependent upon obtaining the AES key 17 and in addition key part 18a is required.

In the following the principle of the distributed private/secret key 18a/18b or the associated signature are explained for the example of an RSA signature.

Signature: $\text{Text}^{privKey} = \text{Sig}$ (The signature Sig is thus obtained from a text by application of the private key privKey, for example by encryption of a hash value of the text).

Verification: $\text{Sig}^{pubKey} = \text{Text}$ (The verification takes place by application of the public key pubKey to the signature received, for example by decryption of the hash value of the text, recreation of the hash value via the text and comparison of the two hash values). In simplified terms:

privKey=1/pubKey.

Thus the signature can also be calculated independently as follows, in that the privKey can be broken down into several summands:

privKey=privKey1+privKey2.

This gives the following:

Signature: $\text{Text}^{privKey1+privKey2} = \text{Text}^{privKey1} * \text{Text}^{privKey2} = \text{Text}^{privKey}$ This means that two signature parts can be calculated that are multiplied together to provide an RSA signature. This can be checked in the conventional manner.

The summands of the key could be stored on the SSMS 14, software 13' and/or hardware in a distributed manner, in order to increase security.

As shown in FIG. 7, during authentication in relation to the banking server 15 two pieces of authentication information (for example signed information) are thus used, of which a first is generated in the software 13' with the first part of the RSA key (privKey1) and passed on to the SSMS 14, and the second is generated in the SSMS 14 with the second part of the RSA key (privKey2) and multiplied with the first authentication information, in order to obtain the full authentication information. This is then returned by the SSMS to the software 13' and can be used by this for authentication in relation to the banking server 15, for example when setting up an SSL/TLS link with client- and server-side authentication according to RFC 5246.

The following references to the literature on the distributed RSA signature are cited by way of example:
1) D. Boneh, M. Franklin, Efficient Generation of Shared RSA keys, Konferenzband Advances in Kryptology—Crypto 97, LNCS 1294 S. 425-439
2) J. Benaloh (Cohen), Secret sharing homomorphisms: keeping shares of a secret, Crypto 86, S.251-260
3) M. Ben-Or, S. Goldwasser, A. Widgerson Completeness theorems for non-cryptographic fault tolerant distributed computation STOC 1988, S.1-10
4) M. Malkin, Th. Wu and D. Boneh, Experimenting with Shared Generation of RSA keys, Konferenzband Internet Societys 1999 Symposium on Network and Distributed System Security (SNDSS), S. 43-56.

Figure 8:
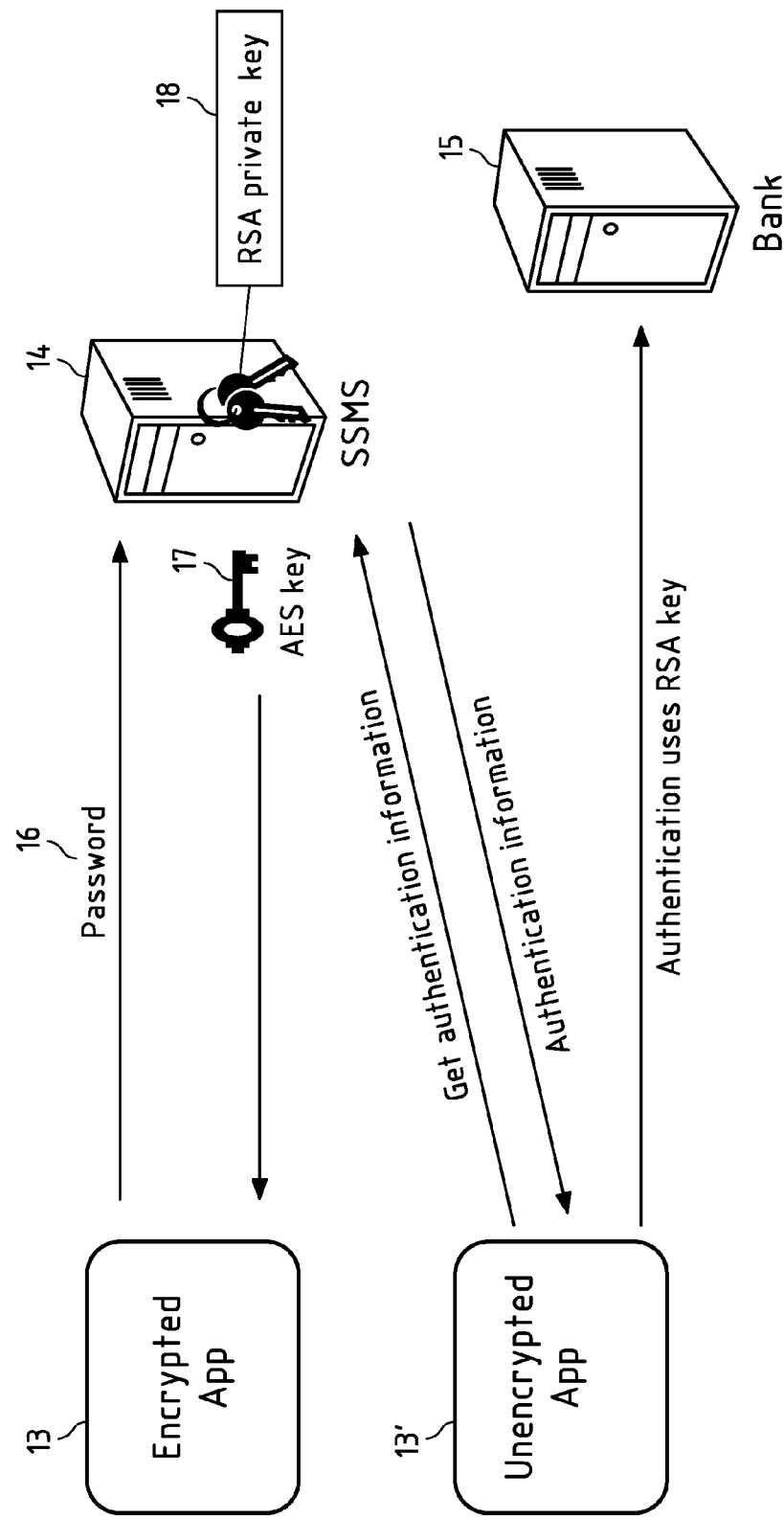

Finally, the private/secret key 18 can also, as shown in FIG. 8, be stored completely in the SSMS 14, and here also the key 18 can only be accessed following authentication at the SSMS 14 and receipt of the AES key 17, for example because communication with the SSMS and/or access to the key 18 stored in the SSMS is only possible with the decrypted software 13'. By way of example the key 18 can be encrypted with a (for example symmetrical) key, which is stored in the decrypted software 13'. In this way (malicious) access of an administrator of the SSMS 14 to the key 18 can be prevented. The key 18 is thus stored on the SSMS 14. Attacks on the software 13' cannot compromise it.

As already generally described above, in order to increase the security an additional hardware component (for example component 12 from FIG. 5), which for example is connected via Bluetooth (or another wireless or cabled connection, for example via near field communication (NFC) or via an acoustic or optical link) to the device/Smartphone, can be used. This hardware component can for example (instead of the device or the software/application), store the private/secret key (for example an RSA key) such that it cannot be read out. The key can then be used solely by the hardware component. The necessary cryptographic algorithms (for example the calculation of signatures) are calculated in the hardware component. It may be a case of a SmartCard+card terminal or another hardware component. The secret key can (for example in the initialisation phase) for example be generated in the device/Smartphone and written to the hardware, or can be generated in the hardware itself. A corresponding public key can in the last case for example be exportable from the hardware, for example to the device/Smartphone or to the SSMS.

The additional hardware component creates a greater obstacle to an attacker, because he/she must control both the software/application or the device/Smartphone, and the hardware component.

Here again various possible scenarios concerning the entry and storage of the PIN, belonging to the Smartcard, can be identified, which are described in the following. Without the PIN for example no access to the private/secret key on the Smartcard or in the hardware component itself is possible nor any use of this.

1. The PIN is entered in the software/application or is stored there.

Here for example the PIN can be entered each time via the software and not stored or entered only once via the software and stored in the software/application for re-use. The PIN can for example be encrypted with the AES-key (or also with the secret/private key of the software, which may also be present in a distributed manner as described for FIG. 7) and stored in the device, for example as a component of the software, but alternatively also independently of this. Without interaction with the SSMS therefore use of the external hardware key is quite impossible—for example in the event that an attacker is not actually using the software himself, but is writing his own software/application, which seeks to access the hardware directly.

If an authentication in relation to a banking server or the SSMS is to take place (as for example has been described regarding FIGS. 2 and 6), information (for example in connection with the client-side authentication) to be signed and/or encrypted can be forwarded by the software to the hardware component and after a check of the PIN decrypted in the software and shown to the hardware component signed/encrypted.

If the software/application and the hardware component are coupled, the hardware component offers no additional protection. The private key can however in this case be read out.

2. The PIN is input each time on the hardware component.

Here there is a very high level of protection for the private key. Due to entry of the PIN being necessary on the hardware component there is virtually no possibility of attack. However, there is a certain effort on the part of the user, who in this case must enter both the password/access code for the software/application and the PIN on the hardware component. The software encrypted with the AES key on the device can be designed to increase security such that communication with or access to the hardware component is only possible via the decrypted software, for example by means of a special authentication feature stored in the software (which can be different from the Smartcard PIN).

3. The PIN is stored by the SSMS and sent via the software/application to the hardware component.

Here an encrypted channel between the software/application and SSMS and/or an encrypted channel between the hardware component and the SSMS can be used. Preferably both channels are encrypted.

This is a convenient and secure method if the PIN is sent by the SSMS via a secure channel to the hardware component (secure messaging between SSMS and hardware component). The PIN should preferably be stored in the SSMS encrypted (for example based on a (for example symmetrical) key, which is stored in the software on the device, which in turn can only be decrypted with the AES key from the SSMS). For an attack the PINs must be extracted from the SSMS and the associated Smartcards stolen.

4. At least a part of the PIN is sent by the SSMS and a part is entered (via the software or on the hardware component).

This variant offers the greatest security. A stolen Smartcard cannot be used without the SSMS, but even with the PIN data from the SSMS an attack only has slight chances of success. The part of the PIN stored in the SSMS can here in turn be encrypted with a (for example symmetrical) key, which is stored in the software on the device, which in turn can be decrypted only with the AES key from the SSMS.

Figure 9:
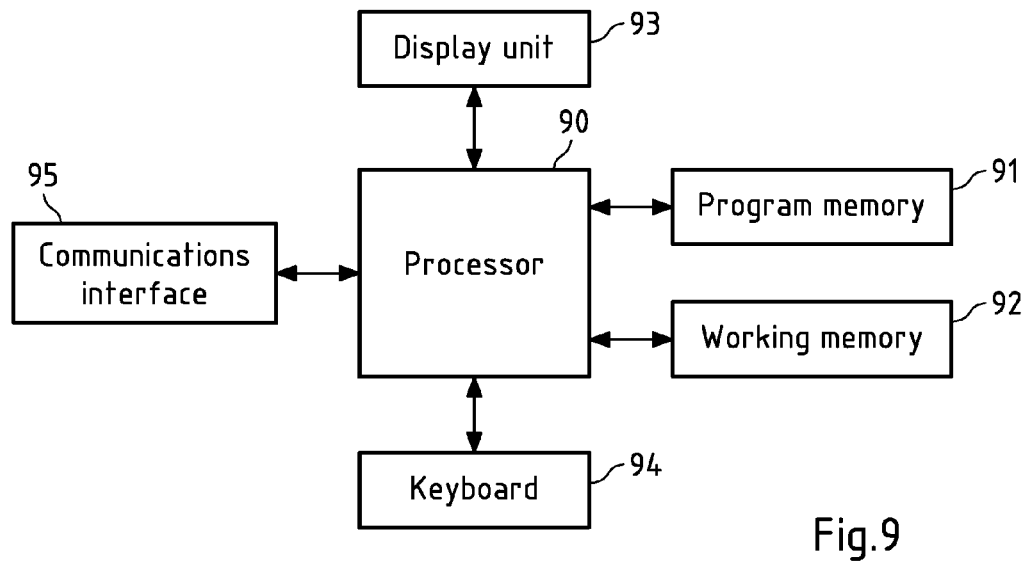
FIG. 9: a schematic representation of the components of an example embodiment of an electronic device according to the invention.

FIG. 9 is a schematic representation of the components of an embodiment of an electronic device according to the invention. The electronic device can for example be a Smartphone, for example the Smartphone from FIGS. 1, 3, 4a, 4b, 5a and 5b. The device comprises a processor 90, which controls a display unit 93 (for example an LCD, for example for producing one or more displays comprising a secure display), a keyboard 94 and a communications interface 95. The communications interface allows communication between the device and other entities (for example with the SSMS and/or the server of a service provider and/or external hardware such as for example a Smartcard reader), for example via wireless or cabled links. The processor 90 executes one or more programs, which are stored in the program memory 91 (for example a flash memory). This may involve an operating system and other programs—in particular the software according to the invention.

The electronic device of FIG. 9 thus constitutes an example of an apparatus according to the invention, which comprises at least one processor 90; and at least one memory 91 including computer program code, the at least one memory 91 and the computer program code configured to, with the at least one processor 90, cause the apparatus at least to perform the method according to the invention that is performed at the electronic device. Example embodiments of this method comprise sending authentication information to the SSMS, receiving the first key from the SSMS, decrypting encrypted information stored on the electronic device with the first key and using this decrypted information in a communication, for example with the SSMS or another server as already comprehensively described.

In order to execute the programs the processor 90 uses the working memory 92, which for example can be designed as a RAM. The certificate store of the software according to the invention can for example be stored in the program memory 91 (or another persistent memory). The encrypted secret key of the software according to the invention can for example be stored in the program memory 91 (or another persistent memory).

Figure 10:
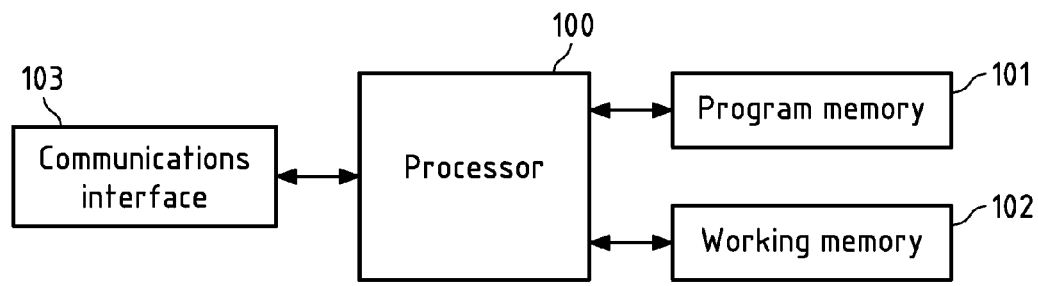
FIG. 10: a schematic representation of the components of an example embodiment of a server according to the invention.

FIG. 10 is a schematic representation of the components of an embodiment of a server according to the invention. The server can for example be the SSMS from FIGS. 1, 2, 4b, 5b, 6, 7 and 8. Basically, however, the server of a service provider (for example a bank) can also have such a structure. The server comprises a processor 100 that controls a communications interface 103. The communications interface allows communication between the server and other entities, for example with other servers and/or with the electronic device according to the invention, for example via an SSL or TLS link. The processor 100 executes one or more programs, which are stored in the program memory 101 (for example a flash memory). This may involve an operating system and other programs.

The server of FIG. 10 thus constitutes an example of an apparatus according to the invention, which comprises at least one processor 100; and at least one memory 101 including computer program code, the at least one memory 101 and the computer program code configured to, with the at least one processor 100, cause the apparatus at least to perform the method according to the invention that is performed at the server. Example embodiments of this method comprise setting up a link with the electronic device, authenticating the user of the electronic device and/or of the electronic device and issuing a first key in the case of successful authentication. Here the issue of the first key can as already described be dependent upon further checks in relation to the software on the electronic device, for example regarding the integrity, the version and/or the linking with the correct electronic device of the software.

The server of FIG. 10 can also be set up for communication with the electronic device according to the invention, for example for setting up a secure link with the electronic device, for sending information on a login and/or transaction procedure to be confirmed or rejected by a user of the electronic device and for receiving signed information (for example concerning the confirmation/rejection of the login and/or transaction procedure) from the electronic device. The server can also be set up for communication with the server of a service provider, on which the user of the electronic device carries out login and/or transaction procedures, for example to positively respond to authentication questions from this server and for issuing authentication confirmations or rejections to the server.

To execute the programs the processor 100 uses the working memory 102, which for example can be designed as RAM.

Figure 11:
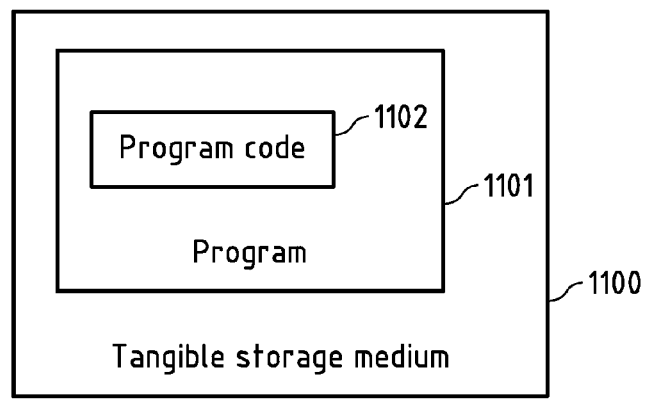
FIG. 11: a schematic representation of an example embodiment of a storage medium according to the invention.

FIG. 11 is a schematic representation of an embodiment of a computer-readable storage medium 1100 according to the invention. The storage medium 1100 stores a program 1101, which in turn contains program code 1102. The program can for example be the software according to the invention executed on the electronic device or the software according to the invention executed on the server. The storage medium 1100 can for example represent the program memory 91 of FIG. 9 or the program memory 101 of FIG. 10. The storage medium 1100 can for example also store the computer program development kit according to the invention. The storage medium can for instance be a tangible storage medium.

The invention has been described using example embodiments. The invention is not restricted to these specific embodiments, however. In particular, the invention can be used not only in the area of online banking, but for example also in other scenarios in which a secure authentication and/or encrypted communication is required, for example for remote access to data or for remote control of plant or machinery.

Examples of areas of application of the invention are:
In the banking sector:
  Ensuring security of the login and/or transaction procedures in online banking and mobile banking.
  Authentication during online payments, where the credit card/debit card is not present. Banks frequently use static PINs or SMS OTPs for so-called 3D authentication (3D secure authentication). These solutions are relatively weak, and the users have no way of displaying and verifying the transaction details in a secure manner. The present invention can be integrated into the 3D authentication and transaction details (via the SSMS) sent to the user for confirmation.
  Authentication for cash withdrawals at ATMs. These can be permitted (by the SSMS), even if no debit card is present, namely by confirmation of a withdrawal from an ATM on a mobile by the user.
In the online gaming sector: these days gaming is widespread on the Internet. Some games require a login, wherein users can share passwords. For some free games however, users may wish to protect their gaming profile and not allow others the possibility, with stolen static passwords, to log in to their accounts. Again, this requirement can be met by the present invention, in that the login procedure of a user is in addition confirmed via the SSMS.
In online Web applications of companies, for example CRM (Customer Relationship Management) systems, ERP (Enterprise Resource Planning) systems, e-mail systems (e.g. Outlook web access). Here the login by the user (and possibly also actions after the login procedure) can be confirmed by the SSMS.
In VPN (Virtual Private Networks)—access, for example via SSL. The SSL link can for example be set up based on a certificate, which can only be decrypted in the mobile terminal once the user has been authenticated on the SSMS.
In online applications in healthcare, for example in electronic access to health records. Here also an additional authentication of a user via the SSMS can take place.
In online gambling. Here also protection of both users and service providers is necessary, which can be guaranteed by additional authentication by the SSMS.

The sequence of the process steps described in this specification is not mandatory, alternative sequences of the process steps are conceivable. The process steps can be implemented in various ways, thus implementation in software (through program instructions), hardware or a combination of the two for implementation of the process steps are conceivable.

The example embodiments of the present invention described in this specification are also deemed to be disclosed in all combinations with one another. In particular also the description of a feature of an embodiment—unless expressly stated to the contrary—shall not be understood here to mean that the feature is indispensable or essential for the functioning of the embodiment.

The invention claimed is:
1. Method, carried out at an electronic device, comprising:
setting up a link with a server;
authenticating at least one of the user of the electronic device and the electronic device in relation to the server;
obtaining a first key from the server upon successful authentication, wherein at least one of the following holds with respect to the first key:

the first key serves for decryption of encrypted data stored on the electronic device to obtain decrypted data intended for a communication of the electronic device, and the first key together with data stored on the electronic device is intended for the communication of the electronic device;

wherein the decrypted data comprises at least one of:
a software for the communication of the electronic device; and
at least part of a second key for at least one of authenticating at least one of the electronic device and the user of the electronic device, encrypting the communication of the electronic device, and signing of messages of the electronic device.

2. Method according to claim 1, the method further comprising:
decrypting the encrypted data stored in the electronic device with the first key; and
using the decrypted data for the communication.

3. Method according to claim 1, the method further comprising, in an initialisation phase:
registering at least one of the user, the electronic device and user authentication information at the server.

4. Method according to claim 1, the method comprising in an initialisation phase:
encrypting data with the first key, in order to obtain the encrypted data; and
storing the encrypted data in the electronic device.

5. Method according to claim 1, wherein the first key is a key that is individual to the user, and wherein the first key is generated by the server during an initialisation phase.

6. Method according to claim 1, wherein the method is at least one of performed and controlled by a software stored on the electronic device, and wherein at least one of at least one feature of the software and at least one feature of the electronic device is checked during the authentication in relation to the server by the server and the first key is only obtained if the check was successful.

7. Method according to claim 1, the method further comprising in an initialisation phase:
generating the second key at the electronic device.

8. Method according to claim 7, wherein the second key is a private key of an asymmetrical key pair.

9. Method according to claim 8, further comprising in the initialisation phase:
outputting a public key associated with the second key to the server to enable the server to generate a certificate based on the public key signed with a key of the server.

10. Method according to claim 9, further comprising in the initialisation phase:
receiving the certificate from the server, and
providing the certificate to an entity to allow the entity to authenticate at least one of the user of the electronic device and the electronic device.

11. Method according to claim 1, wherein the communication requires an authentication of at least one of the electronic device and the user of the electronic device, and wherein one of the following holds for the decrypted data:
the decrypted data contain at least part of information required for the authentication required by the communication, and
the decrypted data are necessary for usage of at least a part of information required for the authentication required by the communication.

12. Method according to claim 1, wherein at least one of the following holds for the decrypted data:

the decrypted data contain at least one of at least a part of a software and information, which is necessary for receiving authentication information stored in the server, and
the decrypted data contain at least one of at least part of a software and information, which is necessary for using authentication information, which an apparatus that can be connected to the electronic device can access.

13. Method according to claim 1, wherein the communication takes place between the electronic device and the server and serves for authentication
in particular out-of-band authentication—of the user in at least one of a login procedure and a transaction procedure, which are carried out by the user of the electronic device with one of the electronic device and another device at a server of a service provider.

14. Method according to claim 1, wherein the communication takes place between the electronic device and the server and serves for transmission of authentication information, which is necessary for at least one of a login procedure and a transaction procedure, which the user of the electronic device wishes to perform with the electronic device at one of a server and a service provider, from the server to the electronic device.

15. A non-transitory computer-readable storage medium storing at least one of:
a computer program with program instructions which, when the computer program is running on a processor, cause the processor to at least one of execute and control a method comprising the steps of:
setting up a link with a server;
authenticating at least one of the user of the electronic device and the electronic device in relation to the server;
obtaining a first key from the server upon successful authentication, wherein at least one of the following holds with respect to the first key:
the first key serves for decryption of encrypted data stored on the electronic device to obtain decrypted data intended for a communication of the electronic device, and
the first key together with data stored on the electronic device is intended for the communication of the electronic device;
wherein the decrypted data comprises at least one of:
a software for the communication of the electronic device; and
at least part of a second key for at least one of authenticating at least one of the electronic device and the user of the electronic device, encrypting the communication of the electronic device, and signing of messages of the electronic device; and
a computer program development kit with computer program modules for creating the computer program.

16. An apparatus, comprising at least one processor; and at least one memory including computer program code, the at least one memory and the computer program code configured to, with the at least one processor, cause the apparatus at least to perform a method comprising the steps of:
setting UP a link with a server;
authenticating at least one of the user of the electronic device and the electronic device in relation to the server;
obtaining a first key from the server upon successful authentication, wherein at least one of the following holds with respect to the first key:

the first key serves for decryption of encrypted data stored on the electronic device to obtain decrypted data intended for a communication of the electronic device, and the first key together with data stored on the electronic device is intended for the communication of the electronic device;

wherein the decrypted data comprises at least one of:
a software for the communication of the electronic device; and at least part of a second key for at least one of authenticating at least one of the electronic device and the user of the electronic device, encrypting the communication of the electronic device, and signing of messages of the electronic device.

17. Method, performed at a server, comprising:
setting up a link with an electronic device;
authenticating at least one of a user of the electronic device and the electronic device; and
outputting a first key in case of successful authentication, wherein at least one of the following holds with respect to the first key:
the first key serves for decryption of encrypted data stored on the electronic device to obtain decrypted data intended for a communication of the electronic device, and the first key together with data stored on the electronic device is intended for the communication of the electronic device wherein the decrypted data comprises at least one of:
a software for the communication of the electronic device; and at least part of a second key for at least one of authenticating at least one of the electronic device and the user of the electronic device, encrypting the communication of the electronic device, and signing of messages of the electronic device.

18. Method according to claim 17, the method further comprising in an initialisation phase at least one of:
outputting of the first key to the electronic device for encryption of data in the electronic device to obtain the encrypted data, wherein the outputting takes place only after successful authentication of the at least one of the user and the electronic device by the server, and
generating the first key.

19. An apparatus, comprising at least one processor; and at least one memory including computer program code, the at least one memory and the computer program code configured to, with the at least one processor, cause the apparatus at least to perform a method comprising the steps of:
setting UP a link with an electronic device;
authenticating at least one of a user of the electronic device and the electronic device; and
outputting a first key in case of successful authentication, wherein at least one of the following holds with respect to the first key:
the first key serves for decryption of encrypted data stored on the electronic device to obtain decrypted data intended for a communication of the electronic device, and the first key together with data stored on the electronic device is intended for the communication of the electronic device;

wherein the decrypted data comprises at least one of:
a software for the communication of the electronic device; and at least part of a second key for at least one of authenticating at least one of the electronic device and the user of the electronic device, encrypting the communication of the electronic device, and signing of messages of the electronic device.

* * * * *

UNITED STATES PATENT AND TRADEMARK OFFICE
CERTIFICATE OF CORRECTION

PATENT NO. : 9,325,708 B2
APPLICATION NO. : 13/488863
DATED : April 26, 2016
INVENTOR(S) : Ismet Koyun et al.

It is certified that error appears in the above-identified patent and that said Letters Patent is hereby corrected as shown below:

In the claims,

Column 38, In Claim 16, line 6, please delete "UP", and replace with --up--.

Column 39, In Claim 17, line 14, after the word "device" please add --;--.

Column 40, In Claim 19, line 6, please delete "UP", and replace with --up--.

Signed and Sealed this
Twelfth Day of July, 2016

Michelle K. Lee
*Director of the United States Patent and Trademark Office*